United States Patent
Vary

(10) Patent No.: US 11,226,852 B2
(45) Date of Patent: Jan. 18, 2022

(54) SYSTEM FOR INTER-PROCESS COMMUNICATION

(71) Applicant: GENETEC INC., St-Laurent (CA)

(72) Inventor: Julien Vary, Orford (CA)

(*) Notice: Subject to any disclaimer, the term of this patent is extended or adjusted under 35 U.S.C. 154(b) by 0 days.

(21) Appl. No.: 16/462,639

(22) PCT Filed: Nov. 16, 2017

(86) PCT No.: PCT/CA2017/051367
§ 371 (c)(1),
(2) Date: May 21, 2019

(87) PCT Pub. No.: WO2018/094509
PCT Pub. Date: May 31, 2018

(65) Prior Publication Data
US 2020/0301765 A1    Sep. 24, 2020

Related U.S. Application Data

(60) Provisional application No. 62/426,347, filed on Nov. 25, 2016.

(51) Int. Cl.
*G06F 9/54* (2006.01)
*G06F 9/52* (2006.01)
*G08B 13/196* (2006.01)

(52) U.S. Cl.
CPC ............... *G06F 9/544* (2013.01); *G06F 9/52* (2013.01); *G08B 13/19676* (2013.01)

(58) Field of Classification Search
CPC .......... G06F 9/544; G06F 9/52; G08B 13/196
See application file for complete search history.

(56) References Cited

U.S. PATENT DOCUMENTS

| 5,371,551 A | 12/1994 | Logan et al. |
| 5,428,781 A | 6/1995 | Duault et al. |
| 5,696,940 A | 12/1997 | Liu et al. |
| 5,797,005 A | 8/1998 | Bahls et al. |
| 6,385,658 B2 | 5/2002 | Harter, Jr. et al. |

(Continued)

OTHER PUBLICATIONS

PCT/CA2017/051367 International Preliminary Report on Patentability Chapter 1 dated May 28, 2019.

(Continued)

*Primary Examiner* — Doon Y Chow
*Assistant Examiner* — Kimberly L Jordan
(74) *Attorney, Agent, or Firm* — Anglehart et al.

(57) ABSTRACT

Described is a novel method of inter-process communication used in one example in a surveillance system whereby multiple input processes communicate surveillance data to a reader process that consumes the data from the input processes. A locking mechanism is provided to reserve a reservable portion of queue metadata which comprises queue pointer(s) such that only one process may move the queue pointer(s) at a time. Reservation is provided with little or no kernel operations such that reservation costs are negligible. Arbitrary size queue slots may be reserved by moving the points. Writing and reading into the queue is done outside of the locking mechanism allowing multiple processes to access and work in the queue simultaneously leading to a rapid queue synchronization mechanism that requires little or no resort to expensive kernel operations.

30 Claims, 9 Drawing Sheets

(56) References Cited

U.S. PATENT DOCUMENTS

| | | |
|---|---|---|
| 6,463,486 B1 | 10/2002 | Parry et al. |
| 6,557,056 B1 | 4/2003 | Lanteigne et al. |
| 6,694,388 B1 | 2/2004 | Schzukin et al. |
| 6,898,650 B1 | 5/2005 | Gao et al. |
| 6,988,122 B2 | 1/2006 | Cole |
| 7,068,921 B1 | 6/2006 | Park |
| 7,130,936 B1 | 10/2006 | Baines et al. |
| 7,734,153 B1 | 6/2010 | Park |
| 7,797,704 B2 | 9/2010 | Anderson |
| 8,078,820 B2 | 12/2011 | Michaylov et al. |
| 8,156,294 B2 | 4/2012 | Inomata |
| 8,484,391 B2 | 7/2013 | Chan et al. |
| 8,838,911 B1 | 9/2014 | Hubin et al. |
| 9,229,847 B1 | 1/2016 | McKown |
| 2002/0078119 A1* | 6/2002 | Brenner .................. G06F 9/526 718/102 |
| 2006/0225078 A1* | 10/2006 | Anderson ............... G06F 9/526 718/104 |
| 2006/0294333 A1* | 12/2006 | Michaylov .............. G06F 9/466 711/168 |
| 2008/0270744 A1 | 10/2008 | Hashimoto |
| 2009/0249356 A1 | 10/2009 | He et al. |
| 2009/0259814 A1* | 10/2009 | Inomata ............... G06F 13/1673 711/154 |
| 2010/0180095 A1 | 7/2010 | Fujibayashi et al. |

OTHER PUBLICATIONS

PCT/CA2017/051367 International Search Report dated Feb. 26, 2018.
PCT/CA2017/051367 Search Strategy dated Feb. 26, 2018.
PCT/CA2017/051367 Written Opinion of the International Searching Authority dated Feb. 26, 2018.

* cited by examiner

SYSTEM FOR INTER-PROCESS COMMUNICATION

This application claims priority of PCT/CA2017/051349 filed Nov. 10, 2017 and also claims priority of U.S. provisional No. 62/426,347 filed Nov. 25, 2016, the contents of which are hereby incorporated.

TECHNICAL FIELD

The present application relates to the field of surveillance systems and to communication systems between multiples processes, these processes used for managing data streams.

BACKGROUND

In modern IP video surveillance, surveillance devices, such as video-surveillance cameras, are commanded and controlled by a central server that sets the configuration and acquires the device's video, audio, analytics and/or metadata streams for both recording and redirection purposes. A security system may involve multiple data sources such as cameras, audio sensors, door and window sensors, motion detectors, and the like. In addition, analytics data and the likes such as license plate information, camera-based object tracking data, and facial recognition data may also be provided to, or derived by the server.

A typical surveillance server system may be responsible for aggregating surveillance data from multiple sources and archiving this data in storage. Other functions of a surveillance server may include displaying video streams on a display, e.g. for security officer(s), and sending certain data for processing or storage elsewhere.

Due to the important functions of surveillance servers, reliability and stability is very important. Servers may receive large quantities of surveillance data from multiple sources, e.g. in streams. The rate of incoming data may vary somewhat, particularly in systems with certain ad hoc sources (e.g. motion detectors, analytics, etc. . . . ). Should the server be unable to manage the incoming data, resulting loss of data may cause security compromises.

As a result server systems must be designed robustly, yet this often comes at a cost in terms of scalability and flexibility. It would be desirable to have scalable flexible systems. Moreover, security systems being critical to security, it is desired that they are resilient and can survive crashed processes with minimal loss of function.

SUMMARY

A surveillance system is proposed with improved scalability, modularity and fault-tolerance at the central server. To this end, the surveillance devices' command and control module may be split from the archiving module. To this end, input tasks have been separated from processing tasks into separate processed with input processes responsible for providing surveillance data and a reader process, responsible for receiving and processing the surveillance data, e.g. for archiving or display. A novel technology for inter-process communication between the input processes and the reader process allows for multiple surveillance data streams to be provided from different input processes to a reader process at high data throughput (e.g. over 300 Mbps) with high reliability. The provided technology also allows for predictive data degradation if the reader process cannot handle all the input data such that critical data is still provided to the reader process while less important data is dropped.

In an exemplary solution, a data queue in shared memory allowing for the control of the space used by the data and for dropping frames if needed provides a system where multiple input processes may communicate with a reader process while not undercutting the performance of the overall system.

Event priority may be enforced by allowing only events into the data queue when a certain usage threshold is reached, discarding video.

A solution is provided that allows data to be inputed in the data queue as complete blocks, and not split and added in two separate locations within the data queue, in order to facilitate output of the data.

Furthermore, the ordering of input from a sources may be preserved which is useful in the case of surveillance systems, as such system may require that the concurrent transferring of multimedia frames and events arriving from multiple sources would then be consumed by an archiving process. Also, in a proposed implementation, the queue may be able to drop certain frames in order to accommodate live viewing if a lag is detected, while ensuring that certain data, e.g. events (e.g. video analytic events) may preferably not be dropped, considering their importance when compared to other data, e.g. multimedia data (e.g. video frames).

In order to write into the queue, the input process may write a complete block of a certain size before marking it as readable. A proposed system allows for many input processes to write simultaneously many blocks into the queue, where these blocks may be of different size, and complete writing them in a different order, but since the single reader process reads the blocks in order, blocking when reaching a slot that is not marked as ready, only complete data blocks are read and the order of processing may be preserved. However, in order to insure that two input processes do not, for instance, write at the same location of the queue simultaneously or quasi-simultaneously, an inter-process synchronization system is preferred.

In a proposed solution, a multiple process synchronization system residing in shared space, while only going to kernel space if there is contention, supporting code re-entry and allowing for reduced fairness between input processes, maintains the performance of the overall system better than a system built around a kernel mutex. The queue, which may be a customized circular buffer in shared memory, allows the central server to process ordered data while ensuring that lags that would impair live monitoring are detected and corrected in a timely manner to provide a highly responsive system to the users. Additionally, allowing only the insertion of prioritized data when the buffer is filled above a certain threshold allows the introduction of multiple classes of service for entering data. The system provides for a locking mechanism functioning as like critical section but between processes. However, as the system is built to support many independent input processes, an underlying mechanism was used to ensure that two processes do not simultaneously execute the locking mechanism (or where one process executes the locking mechanism before the other input process manages to complete it), which may otherwise result in two input processes writing at the same location in the queue. As a solution, the locking mechanism may be conducted as an atomic operation, where one input process may not be interrupted by another during the complete execution of the locking mechanism.

BRIEF DESCRIPTION OF THE DRAWINGS

The invention will be better understood by way of the following detailed description of embodiments of the invention with reference to the appended drawings.

DETAILED DESCRIPTION

Figure 1:
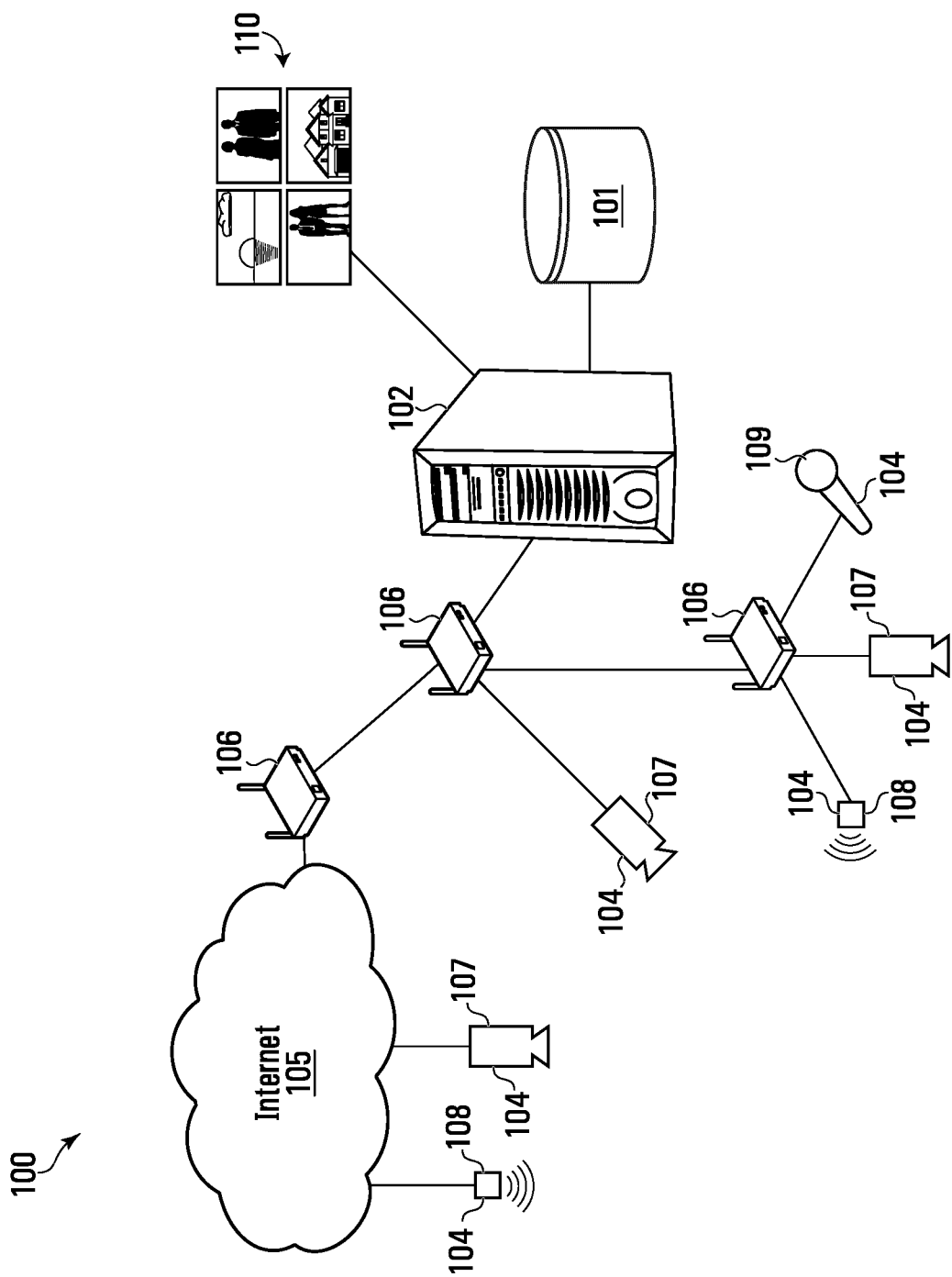
FIG. 1 is a modular diagram of an exemplary surveillance system, in accordance with a particular example.

Reference will now be made to the drawings. FIG. 1 illustrates an exemplary implementation of a surveillance system 100. The system 100 comprises routers 106, a server 102 and data sources 104. The system 100 may comprise an archiving database 110 and a display unit 110. In the illustrated example, the system 100 comprises a data network connecting data sources 104 to the server 102 via routers 106. The system 100 may comprise a connection to the Internet 105 for transmitting data from, for instance, a source 104 located remotely from the data network.

The sources 104 are sources of surveillance data which is transmitted directly or indirectly to the server 102. The sources 104 may include, for instance, camera 107, acoustic transducers 109 (e.g. a microphone), sensors 108 (e.g. heat or movement sensors, noise sensors, vibration sensors) or other sources of surveillance data. In the present example, the camera 107 is configured to provide a video stream. Alternatively, the camera 107 may be a camera system that provides analytics, such as vehicle tracking information or license plate information either alongside a video stream or alone. In one embodiment, the camera 107 is a video surveillance camera with an integrated vehicle tracking function.

Although in this example the sources 104 of surveillance data are connected to the server 102 by a data network, sources 104 may also be directly connected to the server 104. This can be done via an IP-based connection (e.g. Ethernet™) or via another data connection such as an USB connection, provided that the server has appropriate hardware for the connection. The data may be, for instance, video, audio, analytical and/or metadata. The video and/or audio data may be either analog or digital from it source. Digital video data and/or audio data may be either encoded or raw. Formats of encoded video data may include, but are not limited to, H.264, AV1, MPEG-4 or MPEG-2 and may be achieved using different video codecs. Other data, such as audio data, may be encoded. Examples of encoded, compressed audio formats include FLAC, WavPack, Opus, MP3, AAC, Musepack. Typically, data will be transmitted in a streaming format. The data received from the routers 106 or the sensors 104 may be either in a compressed or uncompressed format. Typically, the surveillance data may be provided as a data stream such as a video or audio stream.

In the example shown here, the display unit 110 is a multi-screen display, for visualizing multiple videos simultaneously. In the example shown here it comprises four split-screen displays, each showing the output of four different surveillance cameras (not all of which are shown in FIG. 1). The server 102 provides output to the display unit 110 in real-time from the surveillance video streams. To that end, the server 102 comprises the necessary hardware for driving the display 110 and software for operating it. Other UI hardware may be provided, for example, in alternative embodiments, the system 100 may include a connection of display units, a sound-playback system for isolating and listening to an audio recording, another computing device providing, for example, surveillance data viewing and manipulation capability (e.g. to view and analyze analytics data or to edit, zoom, and crop stills in video files, etc. . . . ). The server 102 may sends visual representations of the data to the display unit 110, allowing a user to access the data, such as by, for instance, visualizing the video on a screen, listening to the audio file or accessing and analyzing the analytics data.

The system 100 of this example also comprises an archiving data storage 101 which in this example is in direct communication with the server 102. In alternate examples the archiving data storage 101 may be provided within the server 102 or may be in indirect communication with the server 102, provided that there is a sufficient data throughput between the server 102 and the archiving data storage 101. In some embodiments, the server 102 may transfer the data either wirelessly or via a wired connection to an external storage unit acting as the archiving storage 101. The archiving storage 101 may be an external memory drive or may be a form of cloud storage.

Figure 2:
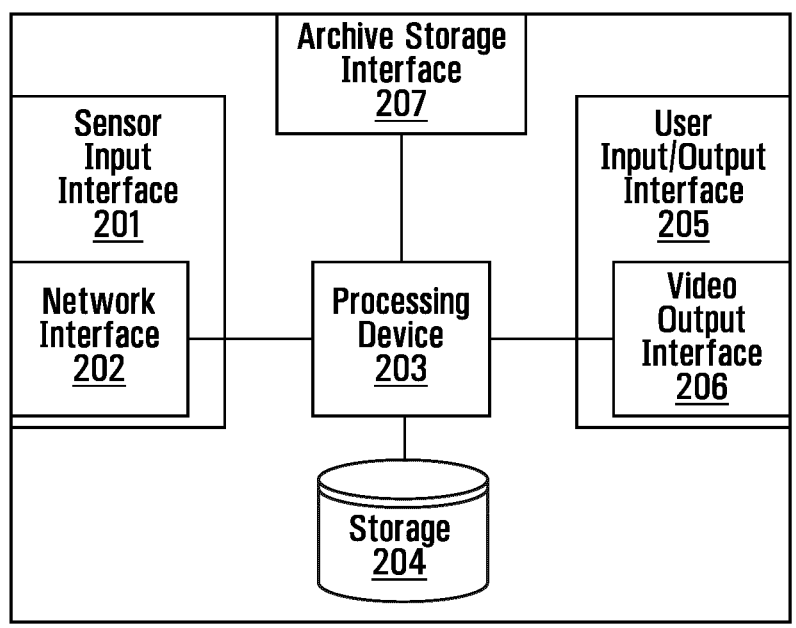
FIG. 2 is a block diagram of the server of the surveillance system of FIG. 1.

Reference will now be made FIG. 2, illustrating an exemplary surveillance server 102. The surveillance server 102 comprises memory 204, a processing device 203, a sensor input interface 201, a user input/output interface 205 and an archiving storage interface 207.

The sensor input interface 201 is an interface through which surveillance data is received from the surveillance data sources 104. In the present example, it comprises a network interface 202 for receiving surveillance data over the data network.

The user input/output interface 205 is an interface for communicating with user output devices such as displays and audio output devices. In the present example, the user intput/output interface 205 comprises a video output interface 206, e.g. comprising a graphics card having four HDMI output ports. In some embodiments the computer may perform decompression of the video data. The input/output interface 205 may also include an interface for communicating with other devices, e.g. to receive commands from a user using a peripheral device (such as a mouse or a keyboard). To this end, the input/output interface 205 may comprise, for example a USB interface for communicating with input/output USB devices.

The processing device 203 is a general-purpose computing device operable programmatically such as a CPU or system of cooperating CPU's. In the present example, the processing device 203 is a multi-core CPU. The CPU runs a multitasking operating system whereby multiple processes may run at the same time. In the present example, the operating system is a Windows™ operating system, although the taught technology may be adapted to other operating systems. Several processes may operate concurrently including the input processes and the reader process taught herein. As described in more detail herein, the input processes write into a queue provided in shared memory the data originating from one or more sources 104 while the reader process reads and processes the data written into the queue.

Because the present technology features separate processes for inputting surveillance data and for processing the surveillance data, the technology may be adapted to run in a distributed environment, provided that the various processes can access a shared memory with sufficient throughput.

The processing device 203 is in connection with the memory 204. The memory 204 is a computer-readable storage system which may comprise multiple levels of storage such as in the form of RAM and a hard drive. In this example, the operating system implements a virtual memory which maps memory space used by applications to physical memory locations. As is typical, the virtual memory is paged into contiguous portions that are loaded in whole into an active memory from a backup memory as needed. Portions of the memory may be shared between programs or processes as shared memory. To this end, the operating system that allocates the shared memory maps it to the virtual memory spaces of the various processes using it. The memory 204 may include a non-transitory computer readable storage medium with computer readable instructions executable by the processing device 203. These computer readable instructions may include computer-readable instructions executable by the processing device 203 to implement one or more of the input processes and the reader process described herein, as well as data used therefor. The memory 204 may also store the operating system, and data used there for. The memory 204 may also store non-instruction data such as files and the like. In the present example, the memory 204 comprises a shared memory space accessible by multiple processes for passing information from one process to another. Although shown here unitarily, it is to be understood that the memory 204 may in fact comprise different types and levels of storage media and may be implemented using a hierarchical structure whereby larger/slower storage space is cached in a higher faster layers of memory. Moreover, memory 204 may also be spread over multiple physical modules, e.g. different modules for different purposes or the like. For the purpose of describing the invention, however, memory 204 is shown as unitary for simplicity.

The archiving interface 207 is the interface by which the processing device 203 interacts with the archiving storage 101. For example, the archiving interface 207 may comprise an SAS interface or the like connected to a bank of hard disk drives provided in the archiving storage 101.

The processing device 203 is also in communication with the sensor-input interface 201, the archiving storage interface 207 and the user input/output interface 205.

The server 102 may optionally also comprise one or more GPUs for decoding and/or performing other manipulations on video stream data originating from a video camera 107.

Figure 3:
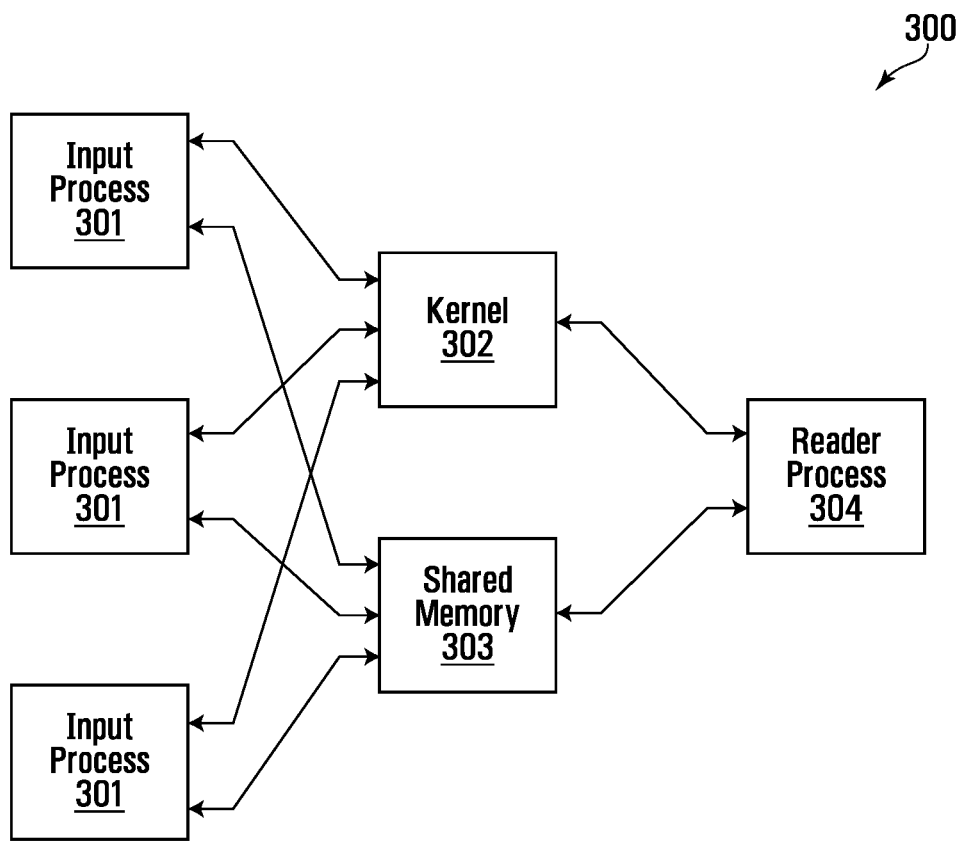
FIG. 3 is block diagram of an exemplary inter-process communication system between input processes and a reader process.

Reference will now be made to FIG. 3, illustrating an exemplary communication system 300 between input processes 301 and a reader process 304. The exemplary system 300 allows for communication between processes while maintaining the overall performance of the system. The system 300 comprises input processes 301, a kernel 203, shared memory 303 and a reader process 304.

The present system 300 is to allow for the transfer of data, e.g. surveillance data, from multiple sources 104, inputted by multiple input processes 301 that can be processed by a reader process 304. In the present example, task of receiving surveillance data from each input has been distributed to multiple processes which are instances of a computer program being executed independently, and the tasks of processing or otherwise consuming this surveillance data has been likewise assigned to an independent process. The processes are instantiated on the server 102 by the execution of program code (computer-readable instructions) defining the processes functions stored in the memory 204. Each process may start, stop, crash independently from the other processes. That being said, processes may be hierarchically organized such that child processes are launched by parent processes. In the present embodiment, the reader process acts as a master process which sets up the inter-process communication (including the queue, discussed further herein) and launches input processes. In case of failure of an input process the reader process can re-launch it.

The process is given an independent address space. This independent address space prevents one process from altering the data of another process. Each process may have multiple threads which execute instructions concurrently.

In the present example, each input process may comprise several threads running concurrently to distribute workload. Data sent in a parallel fashion (e.g. over different sockets) may be read in parallel using multiple threads. For example, each thread may process the data from different surveillance data sources 104 allowing a input process 301 to handle multiple sources. In the present example, an input process 301 be responsible for the data from multiple surveillance data sources 104. The surveillance data of each source may be handled by respective processes in the input process 301. This may be done in any suitable manner. For example, a particular input process may be responsible for the data from 300 cameras that are each streaming in UDP on a unique socket. A threadpool may be implemented to read sockets and each socket is assigned to a thread. When data is ready on a socket, the assigned thread grabs it and pushes it to the queue using the techniques described herein. The thread owner field described below may be used to identify the thread. Each thread may also perform processing on the surveillance data, such as reconstructing frames of video, reformatting or generally preparing the data for the reader process.

Although multiple threads in a single process may accommodate a large number of surveillance source data, there are advantages to distributing the input process tasks over several input processes 301. For example, different input processes may be coded for different types of surveillance data sources. For systems with large numbers of surveillance data source and/or large volumes of surveillance data, splitting the workload over different processes may be required due to addressing space constraints. Moreover, using multiple processes allows for fault isolation in the event of a process crash. In the event that one input processes 301 crashes, the remaining input processes 301 may continue run uninterrupted as may the reader process 304 and these may continue to utilise the circular queue 400 and to communicate as taught herein.

However, by the nature of their independent address space, the processes have no direct communication with one another independently. They require either making kernel/system calls, or accessing shared memory. However, making kernel calls, involves temporally expensive context switching and generally slows down the operations and reducing the overall performance of the inter-process communication system. Accessing memory, in comparison is very rapid, however when using shared memory synchronization is required to avoid collisions and such synchronization typically requires expensive kernel calls. For this reason, the present system provides a way to eliminate or drastically reduce the number of kernel calls used in inter-process communications, allowing input processes to communicate input data to the reader process over shared memory extremely rapidly, which in turn allows the throughput required to run data receiving tasks in separate processes in, e.g., a video surveillance system.

The input processes 301 are in communication with the network interface 202 for receiving a data stream from a source 104. For instance, input processes 301 may each have their own port and port number for binding, receiving data packets from a designated source 104 over a network. The input process 305 receives the data packets from an input stream and reconstructs the communicated data, in this case surveillance data. The input process may perform additional functions on the communicated data. Typically, such functions may include concatenating packets to build video frames and normalizing video into standard formats if necessary. The input process may also include equipment-specific code to receive and treat surveillance data according to particular requirements and/or formats for the specific equipment. The input process then writes the data into shared memory 303 as further described below.

The reader process 304 receives the data from the various input streams 301 and processes it, in this example by transferring the data to the archiving storage 101. To this end, the reader process reads the data written into shared memory 303 by the input process 301. The reading of the data found in shared memory is further described herein. In this example, the reader process 304 also causes the display on the displays 110 of certain surveillance data, in this case selected video streams.

In this particular example, the reader process 304 acts as the master process, that is launched first and controls the launching of other processes including the input processes 301. The reader process 304 initializes a shared buffer in shared memory 303 by setting aside a block of shared memory and assigning a metadata section defining therein data fields regarding the buffer described further herein. The reader process 304 communicates information regarding the buffer, including in this case the location in memory of the buffer and of the buffer metadata, to the input processes 301, e.g. at launch, by any suitable means, e.g. by traditional inter-process communication schemes. The reader process 304 is also responsible in this example for user input/output operations including generating the graphical user interface and interpreting and acting on user input provided through the input/output interface 205. In particular, however, in this example the reader process 304 performs the archiving of the surveillance data provided by the different input processes 301 (including by their different threads if threads are used) and storing it into the archiving storage 101.

In the present example, the buffer comprises a queue, specifically a circular queue, which has been found to be a useful way to manage arbitrary-length or unending streams of data being constantly written into and read out of (and deleted from) the shared memory. For this reason, the term "queue" or "circular queue" is used herein. However, by implementing an appropriate re-ordering or clean-up scheme other data structures may be used in the buffer.

The kernel 302 is a computer program that constitutes the core of a computer's operating system. The kernel performs its instructions in kernel space and not in shared space. When a process makes a call upon the kernel, the process makes a system call. As explained above, when a process, such as an input process or a reader process calls upon the kernel, this leads to a switch between user mode to kernel mode. This may be done by an interrupt. This switch results in a drop in performance due to the added time taken to execute the switch. Therefore, kernel calls are limited in the present system 300 and are done, for instance, in exceptional circumstances, such as when there is contention between two processes as further explained below.

Shared memory 303 is memory found in user space. Shared memory may be accessed by independent programs or processes. Therefore, the shared memory 303 may be accessed by the input processes 301 and the reader process 304. The shared memory 303 may be, for example, random access memory, however in this example its location is managed by the operating system which provides the virtual memory addressing.

Figure 4A:
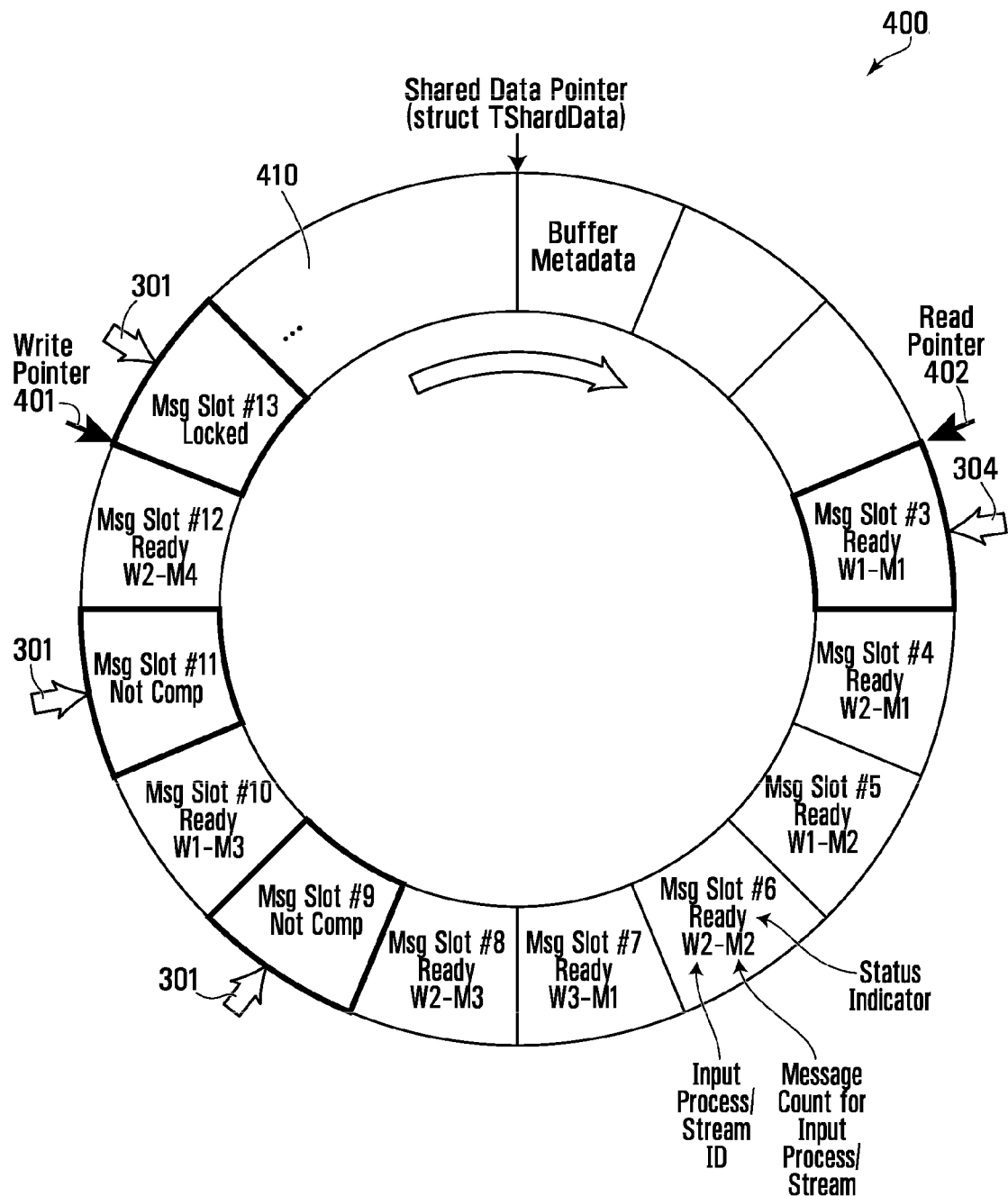
FIG. 4A is logical representation of an exemplary circular queue used in the inter-process communication system of FIG. 3.
Figure 4B:
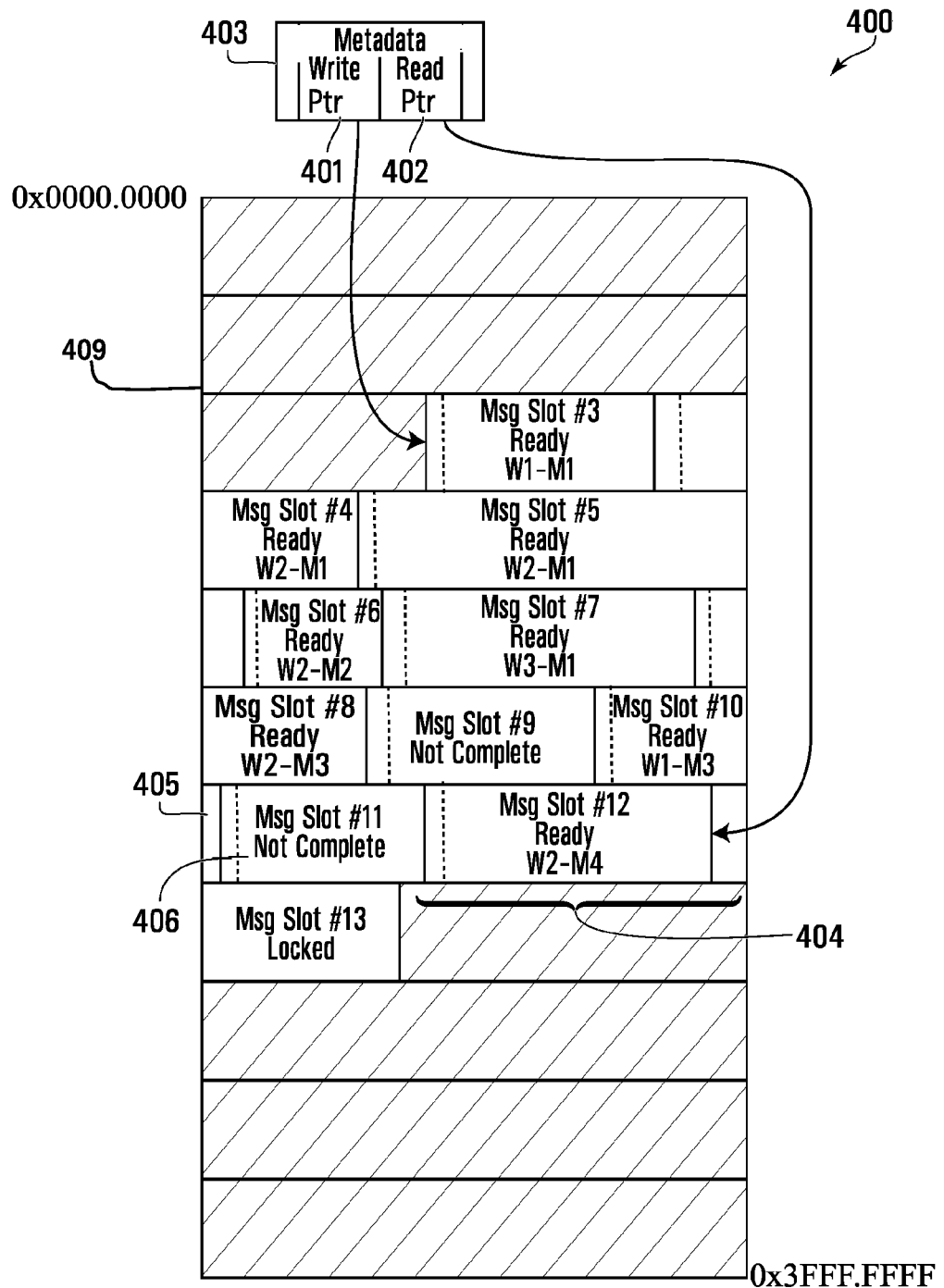
FIG. 4B is a linear representation of the exemplary circular queue of FIG. 2.

Reference is now made to FIG. 4A illustrating a circular queue 400 (also defined as "circular buffer 400") found in the shared memory 303. The circular queue 400 is illustrated logically here as a circle. FIG. 4B illustrates the same circular queue 400 as implemented in a contiguous block of memory. As shown, memory addressing is typically linear and circularity is in fact provided by means of a wrap-around mechanism for the head and tail pointers. It should be noted that although the queue is shown as occupying a contiguous portion of memory 204, this may only be a logical representation. For example, the queue may be implemented non-contiguously and non-linearly in memory being made logically contiguous by a mapping function that maps, e.g. contiguous linear virtual addresses to the physical addresses.

The queue 400 of this example a defined size and location. The queue 400 comprises a data portion 409 and a metadata portion 403. The data portion 409 comprises the queue proper, that is to say it is a portion of memory space where data is stored in a queue data structure. In the present example, the data portion 409 is a linearly contiguous portion 409 of the shared memory, or at least is shown as such for simplicity. However in alternate embodiments the data portion 409 may be spread over a non-contiguous area or non-linearly or both. In such a case, a mapping function providing a translation from a linear and contiguous virtual address space to the physical address space may be used. In the present example this is performed by the operating system.

The metadata portion 403 comprises queue metadata, that is to say information about the queue including information used by the processes to access the queue. In the present example both the metadata portion 403 and the data portion 409 are stored in the shared memory. The metadata portion 403 may comprise a number of fields containing various types of data. In the present example, the metadata portion comprises:

a. A write pointer field comprising data indicative of the start of available writing space in the data queue. In the present example, the write pointer comprises a portion of memory in the metadata portion 403 containing the first memory address following the last slot of data added to the queue. This address represents where to begin writing the next slot of data. Of course, the write pointer may be implemented differently, for example, it may point to the beginning of the last slot added, if the slot size is known (e.g. if the slot size is fixed or if the last slot size is provided elsewhere such as in a field in the queue metadata or in the metadata of the slot).

b. A read pointer field comprising data indicative of the start of readable slots in the data queue. In this example, the queue is a first-in-first-out (FIFO) circular queue and the read pointer is indicative of the oldest slot in the queue that has not yet been dequeued. Specifically here, the read pointer comprises a portion of memory in the metadata portion 403 containing the memory address of the start of the oldest slot in the queue. In this particular embodiment, at initialization, both the write pointer 401 and the read pointer 402 point to the same memory location in the queue 400.

c. A message counter comprising an indication of the number of filled slots currently in the queue. In this example the message counter comprises a portion of memory in the metadata portion 403 containing a integer that is number of slots that have been queued into the queue that have not yet been dequeued.

d. A semaphore field storing a semaphore ID for a semaphore used for communications between processes when the queue is empty. This field is set by the reader upon initialization. If the reader process attempts to read data from the queue but finds it empty, the reader process then goes to sleep to be woken with this semaphore. Once the semaphore is triggered, the operating system wakes up the preader process sleepingon the semaphore.

e. A lock indicator indicative of whether a process has reserved a portion of the queue 400. The lock indicator may be indicative of a reservation of a portion of the metadata of the queue 400, such as the write pointer, the read pointer, or both. In the present example both the write and read pointers are reserved simultaneously and the lock indicator is indicative of whether a process has reserved the write and read pointers. Specifically here, the lock indicator is a memory field comprising an integer value indicative of the number of processes attempting to lock the pointers. When the lock indicator has a value of zero, there are no processes locking the pointers and the pointers are available to be reserved. When the lock indicator has a value of one, a process has reserved the pointers. When the lock indicator has a value greater than one, a process has reserved the pointers and at least one other process has attempted to reserve the pointers and is waiting for the pointers to be available for reservation. The number represents the process having locked the pointers plus the processes waiting on the pointers. The lock indicator may also be called the lock count or lock counter.

f. A process owner field comprising data indicative of a process currently reserving the pointers. In the present example, the process owner field comprises a process ID variable that, when the pointers have been locked, or more specifically when the lock indicator indicates that a process has reserved at least one pointer, is representative of the process that has reserved the pointer.

g. A thread owner field comprising data indicative of a thread within the owner process currently reserving the pointers. In the present example process may have multiple threads that have to engage in inter-process communication using the queue 400 (e.g. an input process 301 having multiple threads communicating data to the read process 304). In such a case each thread of the process may behave as a process, using the queue 400 to transfer data. Thus each process can lock the pointer(s) independently. The thread owner fields comprises a thread ID variable that, when the pointers have been locked, or more specifically when the lock indicator indicates that a process has reserved at least one pointer, is representative of the thread of the process that has reserved the pointer. As described above, a single process may comprise multiple threads for processing data from multiple surveillance data sources 104, such as cameras. In another example, one input thread may be configured to input video data into the queue 400, while a second input thread may be configured to input analytics video data into the queue 400. In this example, the analytics data and the video data may originate from the same source 104, such as a video surveillance camera 107 with license plate tracking, where the license plate tracking information is contained in the analytics data.

h. An event field comprises an event ID for an OS event used to wake up input processes that are sleeping. When an input process 301 attempts to lock the pointers to write into the queue but finds it already locked, the input process 301 spins for a bit (repeatedly re-attempting to lock the pointers) and after a set number of unsuccessful spins, goes to sleep on the event to be woken up by the operating system (OS) upon triggering of the event. Multiple input processes 301 may be sleeping on the same event, only one of which will be woken up according to the operating system processes, which in this case will wake up a sleeping process at random. (The spinning may be omitted in alternate embodiments. Or the spinning may be continued without sleeping, however this is not preferred since it could lead to input processes 301 competing too much with the reader process 304.)

In the present example, the queue 400 has a fixed size set by the reader process during initialization. In this embodiment the queue is adapted for receiving video surveillance data streams and the size of the queue 400 may be between 50 Megabytes to 1 Gigabyte, although this size may be different in other embodiments and may be adapted for the particular data and throughput in. The queue 400 may be defined by a start location and a fixed size or end location in the shared memory 303. Virtual memory mapping may be used to map the virtual addresses of the circular buffer 400 to physical addresses in the shared memory.

The queue 400 may be concurrently accessed by a plurality of input processes 301 and a reader process 304. In this particular example, the queue 400 is not divided into predefined slots of memory of a fixed size and slots of arbitrary size may be provided into the queue 400.

In alternative embodiments, the queue 400 may be subdivided into fixed and predefined memory slots. The queue may be divided logically into slots of fixed sized wherein input processes enqueue data only in blocks sized to fit into the slots one slot at a time and the reader process dequeues data in slot increments. This approach is simpler and requires less overhead related to computing slot sizes, however it has the disadvantage of requiring data chunks exceeding the slot capacity to be split up and transferred over several chunks. Now advantageously the present technology allows multiple input processes to write into the queue simultaneously such that after one input process has reserved a slot and begins filling it, another process can reserve the next slot and fill it. In a fixed-sized slot embodiment, it may be a consequence that a particular data chunk which must be divided into multiple slots be discontinuously entered into the queue since after a first portion of the data chunk has been entered it may be found that the next slot over has already been reserved by another process. This situation is not optimal for certain systems, such as a video surveillance system, where large streams of video data are being transferred by the input process to the reader process, where it is preferable to maintain order within the stream to not have to add an assembly step subsequent to the transferring of the data. However, this drawback of the fixed-sized slot embodiments may be addressed by allowing the reservation of several slots at once, as will be described in more details below.

Reference is now made to FIG. 4B depicting the linear representation of the circular queue 400. As shown here, the queue 400 is in a logically contiguous area of memory shown here as occupying an address space ranging from logical address 0x0000 0000 to 0x3FFF FFFF. It should be noted that these are exemplary only and used for simplicity of illustration. In practice these particular addresses may be reserved by the operating system and the range may be different according to specific space requirements. The metadata portion 403 of the queue 400 may be located logically just ahead of the data portion 409, however this needs not necessarily be the case. In the particular example shown here, the metadata portion 403 is located elsewhere in the shared memory (address not shown). As described, the queue 400 may be initialized by a master process, in this example the reader process, which assigns the queue in shared memory establishing the size and location of the data portion 409 and the metadata portion 403. The master process then communicates to the other processes the details required for them to access the queue 400 including these locations. Since initialization may occur only once (unlike a surveillance data transfer, which may be an ongoing high volume operation), the particular method of communicating queue parameters does not necessarily require a high rate of transfer and may be performed using existing inter-process communication mechanisms.

As shown, the queue 400 comprises a plurality of slots 404 as well as unused space 410. The slots 404 are individual data entries enqueued into the queue 400. Each slot 404 has been inputed into the queue 400 by an input process 301 in a single enqueuing operation, and each is eventually read out and dequeued from the queue 400 by the reader process 304. As described, in this example the slots are not restricted to a standard size (although they may be optionally programmatically limited in the input process algorithms to a certain maximum size) and may be of arbitrary size with each slot being dimensioned in proportion to the quantity of data provided in the enqueuing operation. Thus in this example, the unused space 410 is not pre-subdivided into slots.

In this example, each of the arbitrary sized slots 404 comprises a first portion 405 for containing slot metadata pertaining to the slot 404 and a second portion 406 containing the slot data, that is the chunk of data being communicated by an input process 301 to the reader process 304.

The slot metadata may include information about the slot used by the reader process 304 to read the slot data or other information useful for processing the queue. In the present example, the metadata contained in the first portion 405 includes a size indicator for indicating the size of the slot 404. The size indicator may be used by the reader process 304 to ascertain which portion of the queue 400 to read when dequeuing a particular slot 404. The size indicator provides the reader process 304 with the size of the slot to be read, thus providing a process that has identified the location of the start of the slot 404 with an indication of the location of the end of the slot and the amount of data to be read before completion. In embodiments where the write pointer points at the start of the last-written slot, the size indicator may also be used to compute a new write pointer 401 location and the start location at which to write a new slot by moving the write pointer by a memory distance equivalent to the size of the slot. The write pointer 401 will be newly located in such a manner as to allow for the data stream to be fully inputted into the queue 400 as one continuous segment, avoiding a situation where there would be a lack of space in the allotted slot. This feature is advantageous, for example, in the functioning of a queue 400 without predefined slots of a predetermined and constant size, where instead each slot is arbitrarily determined as a function of the size of the data stream to be inputted. Similarly, the size indicator will be used when computing the next location of the read pointer. Where the read pointer points to the location of the start of the first written slot (among all queued slots that have not yet been dequeued), the size indicator is used by the read process 304 to computer the new location of the read pointer after dequeuing by moving the read pointer by a memory distance equivalent to the size of the slot. Any manner of indicating the size of the slot may be used; in this example the size indicator is an integer defining the number of memory addresses occupied by the entire slot 404 including the first portion 405 and the second portion 406.

The slot metadata of the first portion 405 may also include an arbitrary constant used to verify if corruption is present. In this example, the slot metadata includes a so-called magic number that is an arbitrary 32 bit constant that is used by all input processes 301. The reader process 304 knows the magic number and has a stored copy of it. When reading a slot 404, the reader process 304 reads the magic number and compares it to its stored copy; if a discrepancy is found, the reader process 304 determines that the slot 404 being read has been corrupted. A single occurrence of corruption may be due to arbitrary memory errors, however in some embodiments, the reader process 304 may determine on the basis of one or more determinations of corruption that the queue synchronization has been compromised, e.g. on the basis of a finding that a certain number of consecutive slots have been corrupted. In response the reader process 304 may reinitialize the queue and communicate by inter-process communication to the input processes 301 the reinitialization of the queue and the new queue parameters.

Finally, the metadata of the first portion 405 may also include a status indicator for indicating a status for indicating when an input process is inputting the data stream into the queue 400 but has not completed (e.g. of "started but not completed"), a status for indicating when the reader process 304 is ready to read but the writing process 301 has not completed writing the data stream into the contiguous slot (e.g. "reader thread waiting for message completion") and a status for when the input process 301 has completing inputting the data stream (e.g. "ready for reading"). In this particular example, a "reading in progress" status is not required, since no input process 301 can write over a slot being read given that the tail pointer is not moved past the being-read slot until after it has been read and since a single reader process is provided. In alternate embodiment such a status could be used to avoid contention between multiple reader processes if provided. In a preferred embodiment, the change of status of the status indicator is performed as an atomic operation. In some embodiments, the metadata of the first portion 405 may also provide status indicating a slot is in the process of being read/dequeued. This may be provided by way of a fourth possible status value indicative of "being read" for the status indicator or by means of a second status indicator. Such embodiments may be useful in variants where there are multiple reader processes sharing the dequeuing task to indicate by a first reader process to other reader processes that a particular slot is being dequeued by the first reader process and to move on to the next slot. In the illustrated example, the input processes 301 will not write into a slot being read because the read pointer is not moved to the next slot until after reading is completed and because the input processes 301 are programmed not to write (or move the write pointer) past the read pointer. However, in variants where such restriction is not present, the "being read" status may indicate to input process 301 not begin inputting until the reader process 304 has finished reading the data in the last slot 404. In the present example the status indicator is a mere two bit binary value with, for example a value of "00" meaning "started by not completed", "01" meaning "reader thread waiting for message completion" and "10" meaning "ready for reading".

Figure 7:
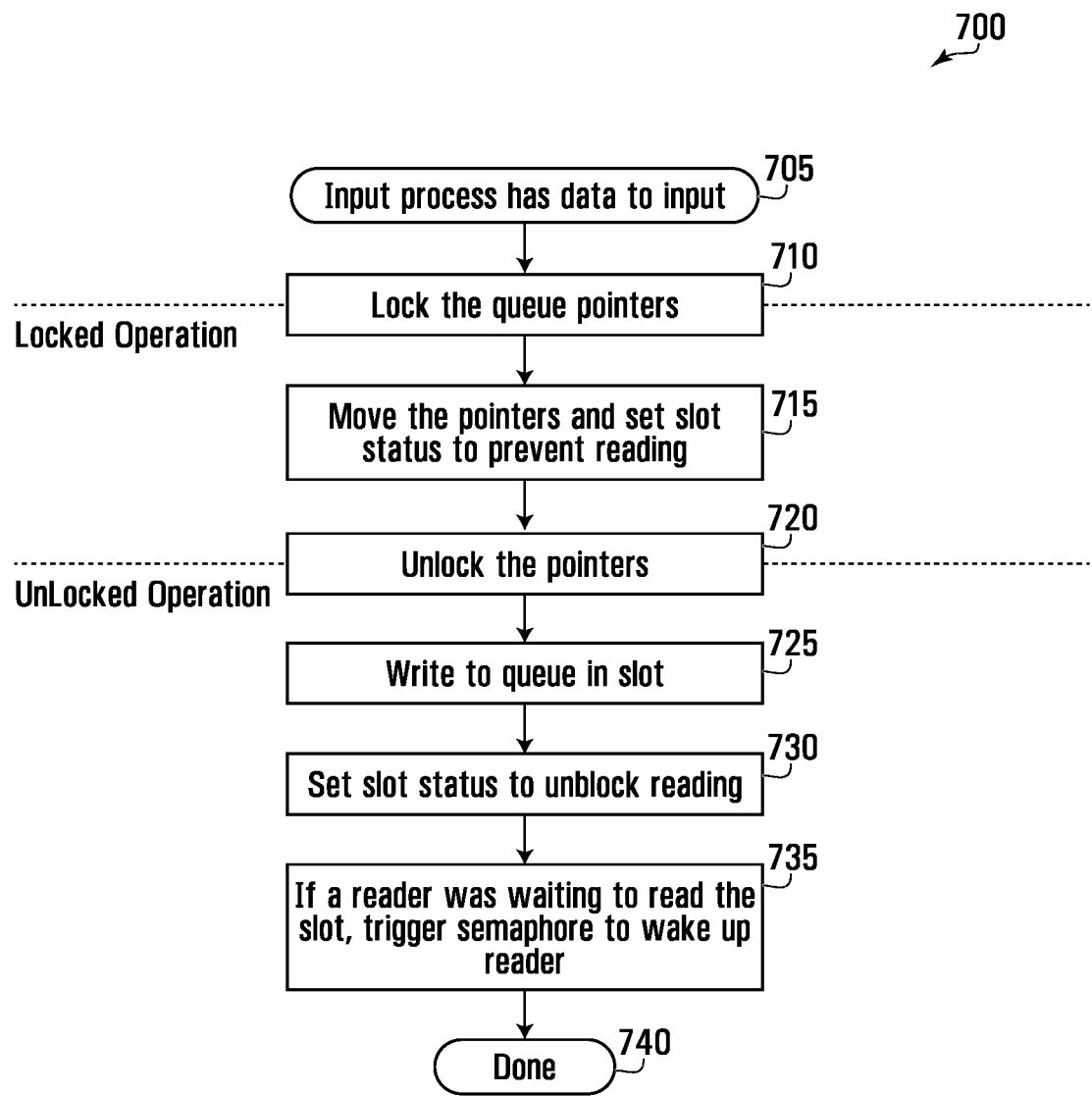
FIG. 7 is a simplified flowchart of the method of FIG. 5, emphasizing locked and unlocked operation.

FIG. 7 is a flow chart depicting the steps of inputting data in the queue 400 showing the locked and unlocked portions of the operation. When an input process 301 has data to input into the queue 400, the input processes first locks the queue pointers at step 710, using, for example, the mechanism to do so described herein. Once the queue pointers are locked, then next step is that the pointers are moved, e.g. as described herein, and the slot status is set to an indicator that the slot is being written in, e.g. as described herein, to avoid the reader process 304 reading into the slot while it is being written into. Once this is done, the input process 301 can then cause the unlocking of the pointers at step 720, at which point we enter unlocked operation. Note that the steps taken during locked operation are very short and quick. Once unlocked operation beings, the input process 301 then writes 725 into the slot reserved during locked operation. Note that the entire time spent writing into the slot occurs during unlocked operation, which means that other processes may operate on the queue, including writing into it, simultaneously. Once the writing is done, the input process 301 set the slot status to allow reading of the slot by the reader process 304. At the same time the input process 301 verifies if a reader process was waiting to read from the slot by verifying whether a reader process changed a value in the slot to indicate as much. If so, then at step 735, the input process 301 triggers a semaphore to wake up the reader process 304 to allow it to read from the slot. The input operation is then complete 740. As will be appreciated, only a small portion of the time of a typical writing operation will take place in locked operation, while the most time-consuming portions are spent in unlocked operation.

Figure 5:
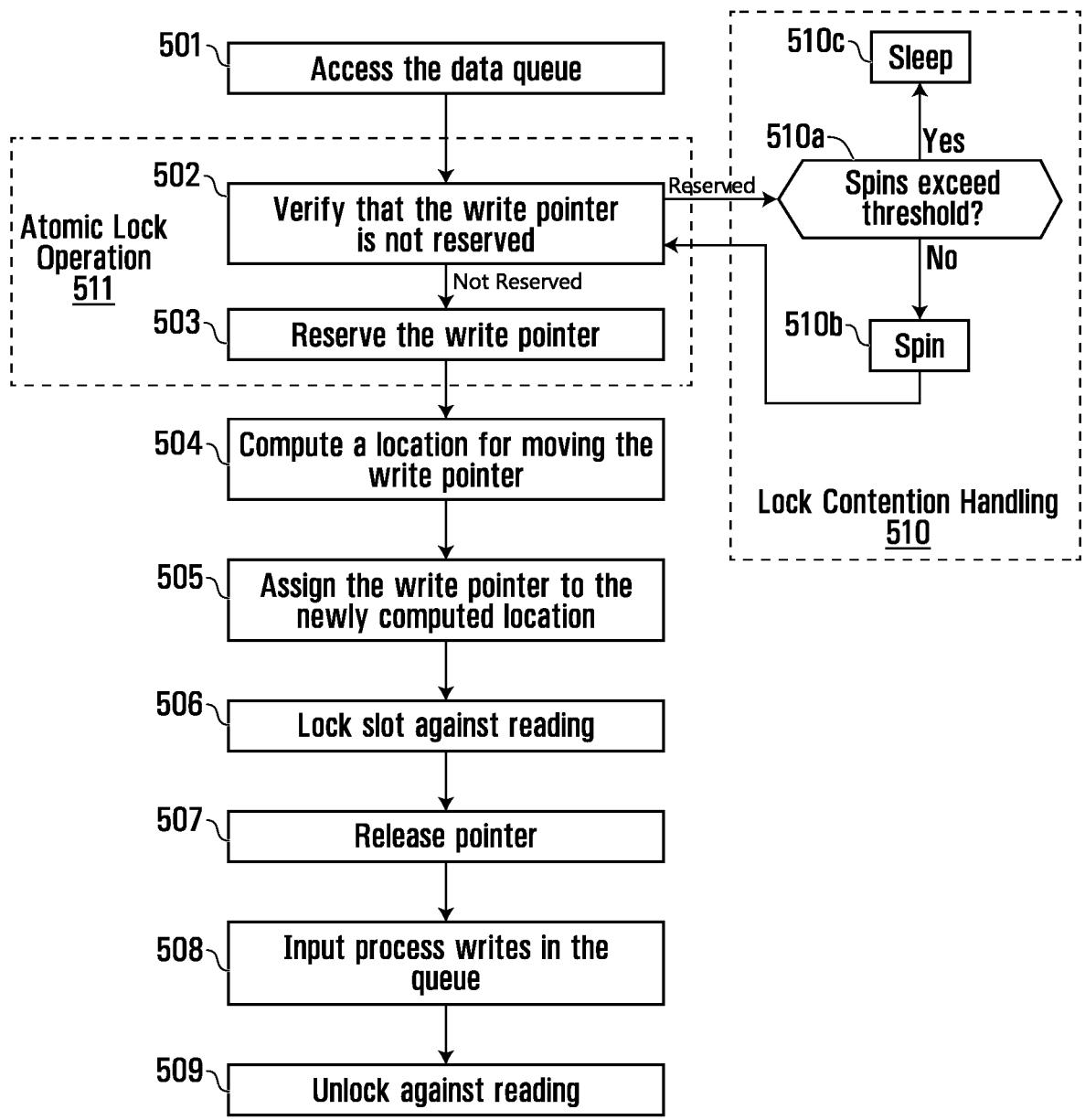
FIG. 5 is a flowchart diagram of an exemplary method for writing an arbitrary sized portion of data into a queue.

Reference will now be made to FIG. 5 illustrating an exemplary method 500 for writing an arbitrary sized portion of data into the queue 400, by a particular exemplary input process 309 from among the plurality of input processes 301 where the input processes 301 are in communication with a reader process to transfer portions of data streams from sources 104 to the reader process 304 via the queue 400 which is accessible to the input processes 301 and the reader process 304. Although this example is provided with reference to a particular input process 309, it is to be understood that other input processes from among input processes 301 may work in the same way. In such a context, the present embodiment allows for rapid queue synchronization whereby the various input processes 301 and the reader process 304 can read and write from/into the queue 400 without accidental overlap.

When the input process 309 has a defined a chunk of data that it means to transfer to the reader process, the input process 309 accesses the queue 400 at step 501. Accessing the queue 400 means generally gaining access of any kind to the queue, including locating it in memory, or the like. In the present example, the input processes 301 have been provided with the parameters of the queue 400, including the location of the metadata portion 403 and the address space of the data portion 409 of the queue 400. In an example of accessing the queue 400, the input process 309 may read the queue metadata in the metadata portion 403. The reader process may then read queue related data such as the location of the write pointer and the read pointer, the message count and the like.

At step 502, the input process 309 performs a verification that the write pointer 401 is not reserved, e.g. by another input process. In this example, this verification is done by reading the indicator from the metadata portion 403 of the queue 400 and ascertaining on the basis of the lock indicator value (e.g. by comparing its value to zero) whether the write pointer is reserved. Note that in the present example the write and read pointers are reserved simultaneously thus the lock indicator indicates whether both pointers are reserved.

Upon establishing that the write pointer 401 is not reserved, the input process 309 reserves the write pointer 401 at step 503. The reserving of the write pointer 401 may be done by switching the variable found in the lock indicator from 0 to 1, where 1 indicates that the write pointer 401 is reserved. Once the write pointer 401 is reserved, no other input processes may access the write pointer 401, as these other processes would, in verifying if the write pointer 401 is reserved, find that it is and perform lock contention handling provided by their programming, such as lock contention handling 510 described herein in the case of input processes 301. In this embodiment, since the lock indicator indicating that the write pointer 401 is reserved also applies for the read pointer 402, the reader process 304 will similarly not be able to access the read pointer 402 as long as it is reserved. Advantageously, this prevents collisions between input processes 301 and the reader process 304.

In the present example, the step 502 of verification of whether the write pointer 401 is reserved and the step 503 of reserving the write pointer (e.g. by assigning it a value indicative of the fact that the pointer(s) is/are reserved) is performed as a single atomic lock operation 511 such that it may not be interrupted by another process as it completes the designated operation. The atomic nature of the operation is useful in a multi-process system where each process is independent from the other, and avoids the situation where two input processes 301 simultaneously or quasi-simultaneously reserve the write pointer 401 and begin to write in the same portion of the queue 400, where one input process 301 would write over the data of the other input process 301 before the reader process 304 has had the opportunity to read the data. Specifically, it avoids the potential situation where two input processes would verify the lock indicator and find the write pointer 401 before either process changes its value and therefore both assign the lock indicator a "locked" value believing that they have reserved the pointer. Atomic operations are typically made available by the operating system. For example, where the operating system is a Windows™ operating system, Interlocked functions are made available via the Interlocked API that allows certain operations on shared memory variables to be performed atomically.

The locking mechanism described herein provides a type of critical section which works amongst multiple processes. It provides advantages of a critical section while allowing exclusivity over multiple processes and avoiding the disadvantages of other attempts at multi-process critical sections such as Metered Section in Windows™ which is subject to bugs. Not that this critical section-like mechanism is only used for very short duration to move pointers rather than to read and write in to the circular queue.

If the lock indicator indicates that the write pointer 401 is currently reserved, then the input process 309 performs lock contention handling 510. In this example, the lock contention handling 510 comprises a procedural spin performed, attempting at each spin to perform the atomic lock operation 511. In this example, the spin is performed a threshold number of times before sleeping the input process 309, to be woken up by an OS event. At step 510*a*, the process verifies an internal spin value to determine whether the threshold spin value has been exceeded. Find it not exceeded, the process performs the spin 510*b*, which is a repeating procedure wherein it increments the internal spin count and attempts to perform the atomic lock operation 511 again. If at step 510*a*, the input process 309 determines that the spin count exceeds the threshold (in this example a fixed value of 4000), the process increments the lock count atomically then goes to sleep to be woken up by an OS event triggered upon de-reservation of the pointers Once the write pointer 401 is reserved by the input process 309, the input process 309 sets the process owner value to its process ID and the thread owner value to the current thread ID. This is done once the pointer has been reserved. It also increments the message count while the pointer is reserved.

Having reserved the write pointer 401 (and in this case, also the read pointer 402), the next location of the write pointer along the queue 400 is computed in order to accommodate the arbitrary size of the data stream in a logically continuous slot of the queue 400 at step 504. As explained above, in the present embodiment, the circular buffer 400 does not have predefined and fixed memory slots. Instead, the size of the data chunks inputed may vary and appropriate size slots in the queue 400 are to be assigned to accommodate this size. Therefore, this size is computed before assigning the pointer to a new location in the queue 400 as the size is necessary to assess if the input process 309 has sufficient space before doing so. In the present example, the input process 309 verifies whether there is sufficient space in the queue 400. In the present example where the queue may accommodate slots of arbitrary size, this involves computing the size of the slot required (by adding in this case the chunk of data which will form the second portion 406 of the slot to the size of the metadata portion 405 which in this example is a fixed size) and computing the size of available space in the queue (by comparing the number of memory addresses between the read pointer location and the write pointer location). The input process 309 then compares the space available in the queue and the size of the slot required and upon finding that the space available is greater than the size required, determines that there is sufficient space and proceeds to the next step in writing into the queue.

In the present embodiment, when an input process 301 finds the queue to be too full to accept the data it wishes to write into it, the data is simply dropped. This is a preferred implementation when dealing with high volumes of streaming data as it avoids excessive backlogs. However, in alternate embodiments, other mechanisms could be implemented. For example, certain input processes 301 or threads that receive more important data and/or smaller quantities of data (e.g. data coming from an access control device such as an ID card reader) may implement a waiting procedure such as spinning or sleeping on an event to wait until the queue has available space. A similar solution as is provided for when input processes 301 are unable to reserve the pointer may be implemented to this end.

Upon determining that there is space available, the input process 309 then moves the head pointer to accommodate the new slot 404 it will write into the buffer. More specifically, the input process 309 computes a new pointer value for a new location of the write pointer as a function of the current write pointer location and the data to be added to the queue (specifically in this case by adding the size of the slot (here: first portion 405 which is of fixed size plus second portion 406 which is of the size of the chunk of data to be added to the queue). In the present example, the input process 309 adds the new slot size to the current pointer location, although it also comprises procedural steps for dealing with rollover conditions whereby when adding the slot size to the pointer value leads to the pointer value extending beyond the memory location range of the queue 400, the new pointer location loops back to the front of the queue. This may be done by a modulo operation or using the manner described in pseudocode herein, wherein if the new write pointer would exceed the end of the available queue space, the new slot simply begins at the start of the queue space (i.e. 0x0000 0000) and the new location of the write pointer is one new slot away from there, provided of course that there is sufficient space available. Any technique for making the queue circular may be used.

It should be noted that in the present example, the input process 309 also computes a write location indicative of where to write the new slot, which in this example may be the location of the write pointer prior to having been moved.

The present technology allows for prioritization of input data. Certain data streams have priority over other data streams. In the present example, this is achieved by performing a different computation of available space based on the type of data being added to the queue 400. In the present example the chunks of data added to the queue 400 by the input processes 301 are from streams of surveillance data. Some surveillance data, such as video streams, can be partially lost (e.g. dropped frames) without dire consequences, while other types of surveillance data (e.g. events, such as door use events, or card scan events from card scanners) cannot be lost (even partially) without losing important information. To ensure that lower-priority data do not fill the queue 400 potentially leading to the loss of high priority data, in the present example input processes 301 compute availability of data based on different portions of the queue for different types of data. In the particular example provided here, space availability for video stream data is based on 80% of the overall queue size, that is to say that once the queue reaches 80% of capacity, it is considered full for video stream data. Meanwhile, space availability for surveillance event data is based on 100% of the overall queue size, that is to say that once the queue is only considered full for such data when it is in fact full. As such, the last 20% of the queue will always be reserved for higher priority data. It will be understood that more priority levels may be provided at different levels of the queue and that other techniques for reserving a part fo the queue for higher priority data may be used if appropriate.

In the present embodiment, technology is provided to ensure that the reader process 304 is not reading from a slot 404 that is currently being written into by a input process 301. Specifically here, this is done using a lock indicator in the slot metadata in the first portion 405 of a slot 404. In particular, before beginning to write into the new slot, the input process 309 at step 506 sets the slot status indicator to a value indicative of "started but not completed" (i.e. "being written into"). This status indicator indicates to the reader process 304 that the slot is not ready, should the reader process attempt to read it. Preferably, the assignment of this value to the status indicator is performed while the pointers are locked, such that the reader process 304, which is programmed in this example to only read from a slot after a successful lock of the buffer, cannot start reading from the slot before the status has been set. Preferably also the status operation is part of an atomic status (check-and-set) operation whereby the status of the slot is also ascertained by the input process 309.

Having reassigned the write pointer, any other input process wanting to write into the queue 400 will compute the write location from the new write pointer location, ensuring that they will not write over the space that is now reserved for the slot of input process 309 by virtue of the write pointer 401 having been moved. As such, the input process 309 may then unlock the write pointer 401 (and therefore in this case, also the read pointer 402). In this example, the input process 309 unlocks the pointers at step 507 by atomically reading the lock count and decrementing it. If on the basis of the value of the lock count when it atomically read and decremented it, it finds that there was another process waiting to reserve the pointers, the process 309 may trigger an OS event to wake up one of the sleeping processes.

Once the write pointer 401 is no longer reserved, this allows for another input process 301 to reserve the write pointer 401 and to begin writing data into its designated slot in the queue 400, provided that the other conditions, as detailed above, have been met.

Once an input process 301 has been provided with the start location of the available writing space in the queue 400, the input process 301 may begin inputting the arbitrary sized portion of the data stream into the logically contiguous slot of the data queue 400 specifically in the second portion 406 of the new slot 404. The input process 301 begins writing the data stream into the contiguous slot at step 508.

Once the input process 301 has completed inputting the data stream into the contiguous slot, the status indicator found in the metadata of the first portion 405 is modified to indicate that the slot is ready for reading by the reading process 406 at step 509. In a preferred embodiment, the value of the status indicator is also verified in an atomic check-and-set operation at step 509 in order to ascertain whether the read process 304 has attempted to read the new slot (and therefore set the status to a value indicative of "reader thread waiting for message completion") while the input process 309 was writing. If it is determined based on the status indicator that the reader process is waiting to read the new slot, a semaphore is triggered to signal to the reader that the new slot is available.

Figure 8:
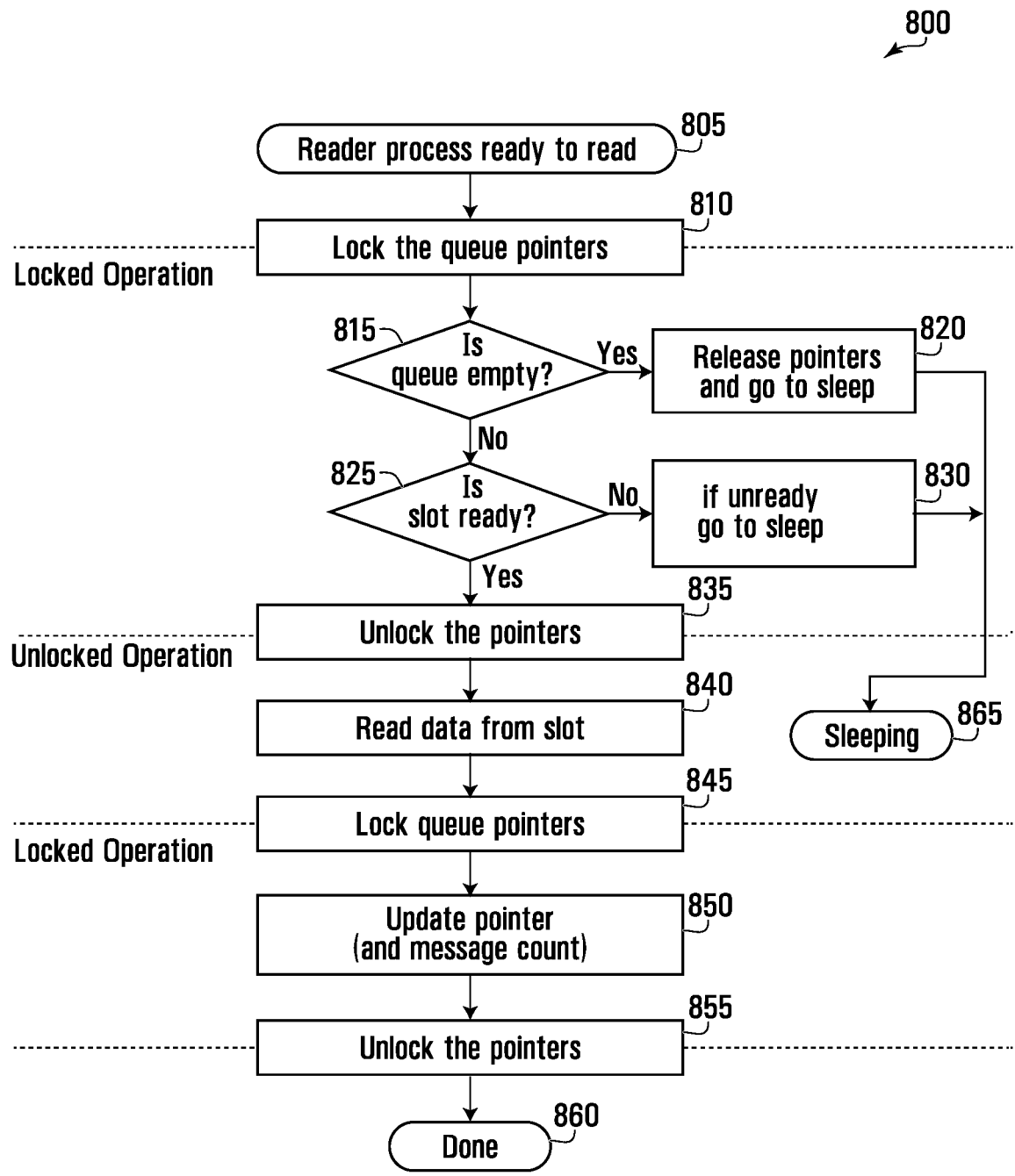
FIG. 8 is a simplified flowchard of the method of FIG. 6 emphasizing locked and unlocked operation.

FIG. 8 is a flow chart depicting the steps of reading data from the queue 400 showing the locked and unlocked portions of the operation. When reader process 304 is ready 805 to read from the queue 400, the reader process 304 first locks the queue pointers at step 810, using, for example, the mechanism to do so described herein. Once the queue pointers are locked, the reader process 304 first verifies if the queue 400 is empty at step 815, and if it is, then it releases the pointers 820 and goes to sleep 865. If the queue 400 is not empty, then the reader process 304 checks 825 the slot status of the next slot to see if the slot is ready to read. If not, then at step 830, the reader process 304 spins and retries a certain (e.g. pre-set) number of times, and if after this the slot is still not ready to be read, then the reader process 304 goes to sleep 865. If on the other hand the slot is read, then the reader process 304 releases the pointers. Note that in this embodiment there is only one reader process, however if the number of reader processes is modified, it may be preferred to include movement of a read pointer during locked operation and/or to add another pointer to indicate where readers are currently reading from. At step 835, the reader process 304 unlocks the pointers to end locked operation and enter unlocked operation. Note that the steps taken during locked operation are very short and quick. Once unlocked operation beings, the reader process 304 can then read 840 the data from the slot. Note that the entire time spent reading from the slot occurs during unlocked operation, which means that other processes may operate on the queue, including writing into it, simultaneously. Once the reading is done, the reader process now locks the queue 400 at step 845 to return in locked operation. In locked operation, the pointers are updated e.g. as described here and the message count may be updated as well at step 850. Once this is done, the pointers are unlocked 855 to exit once again from locked operation into unlocked operation. The read operation is now complete 860. As will be appreciated, only a small portion of the time of a typical reading operation will take place in locked operation, while the most time-consuming portions are spent in unlocked operation.

Figure 6:
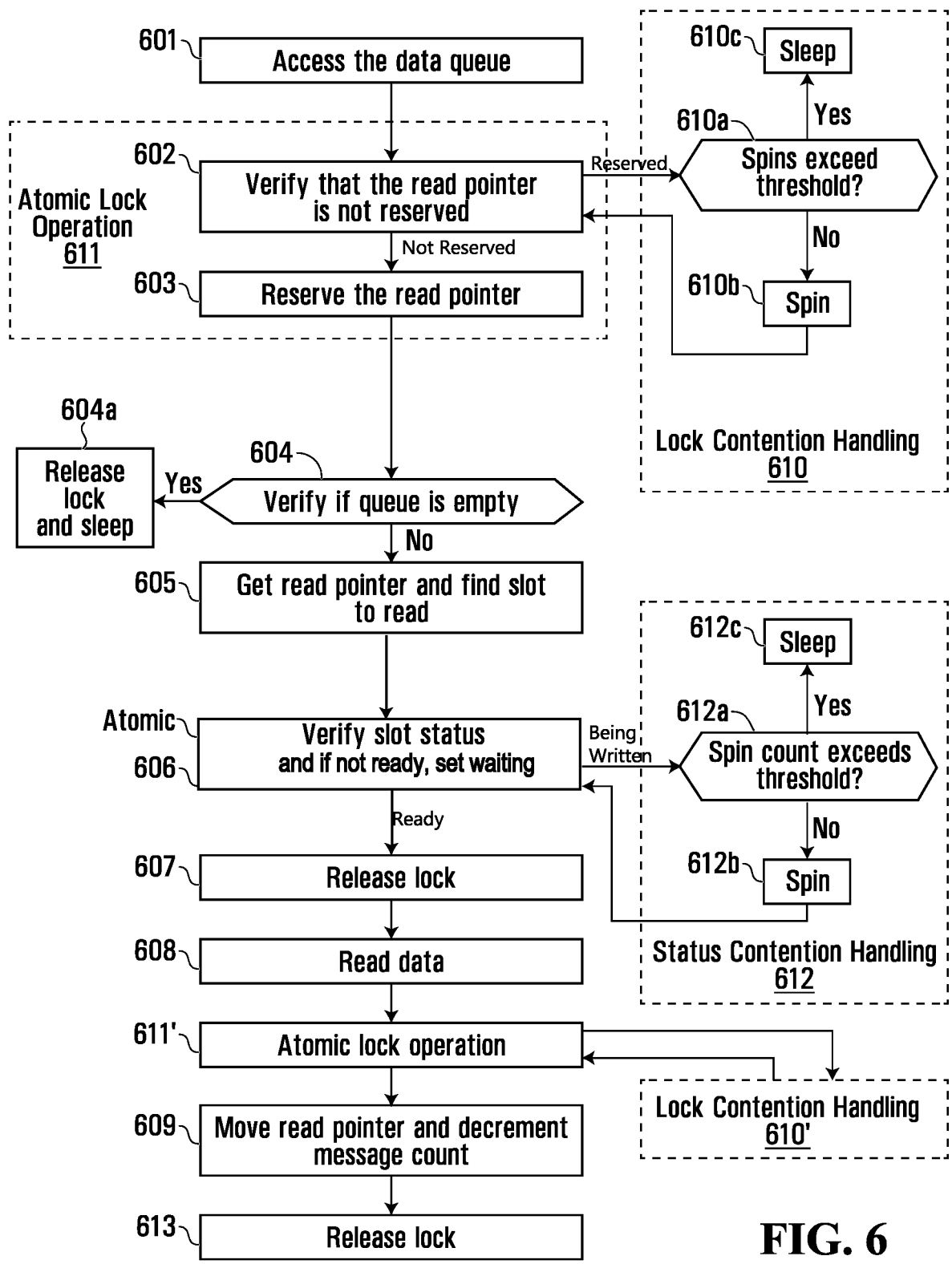
FIG. 6 is a flowchart diagram of an exemplary method for reading data slots in a queue.

Reference will now be made to FIG. 6 depicting an exemplary method for reading data slots from the queue 400 by the reader process 304. In particular, in this example, the reader 304 read an arbitrary size data slot from queue 400. Here, a plurality of input processes 301 are in communication with the reader process 304 to transfer portions of data streams from sources 104 to the reader process 304 and the reader process 304 may read the queue 400 to process data stored therein. The queue 400 is stored in shared memory is and simultaneously accessible to the input processes 301 and the reader process 304. The reading method allows for rapid queue synchronization and avoids interference from input processes 301 while allowing input processes 301 from writing to the unused portions of the queue while the reader process 304 reads.

When the reader process 304 is ready to process data from the input processes 301, it accesses the queue 400 in the shared memory at step 601. Accessing the queue 400 means generally gaining access of any kind to the queue, including locating it in memory, or the like. In the present example, the reader process 304 has initialized the queue 400 and has access to data containing the parameters of the queue 400, including the location of the metadata portion 403 and the address space of the data portion 409 of the queue 400. In an example of accessing the queue 400, the input process 309 may read the queue metadata in the metadata portion 403. The reader process may then read queue related data such as the location of the write pointer and the read pointer, the message count and the like.

At step 602, the reader process 304 performs a verification that the read pointer 402 is not reserved. In the present example, the reader process 304 is the only reader process that could displace the read pointer 402, however in this embodiment the write pointer 401 and the read pointer 402 are reserved simultaneously such that reserving one reserves the other and vice versa. Thus at step 602 the reader process verifies whether the pointers (both the write pointer 401 and the read pointer 402) are reserved, e.g. by an input process 301. In this example, this verification is done by reading the indicator from the metadata portion 403 of the queue 400 and ascertaining on the basis of the lock indicator value (e.g. by comparing its value to zero) whether the write pointer is reserved.

Upon establishing that the write pointer 401 is not reserved, the reader process 304 reserves the read pointer 402 at step 603. The reserving of the read pointer 402 may be done by switching the variable found in the lock indicator from 0 to 1, where 1 indicates that the read pointer 402 (in this case both pointers) is reserved. Once the read pointer 402 is reserved, no other processes may access the read pointer 402, as these other processes would, in verifying if the read pointer 402 is reserved, find that it is and perform lock contention handling provided by their programming, such as lock contention handling 510 described herein in the case of input processes 301. In this embodiment, since the lock indicator indicating that the read pointer 402 is reserved also applies for the write pointer 401, input processes 301 will similarly not be able to access the write pointer 401 as long as it is reserved. Advantageously, this prevents collisions between input processes 301 and the reader process 304.

In the present example, the step 602 of verification of whether the read pointer 402 is reserved and the step 603 of reserving the read pointer (e.g. by assigning it a value indicative of the fact that the pointer(s) is/are reserved) is performed as a single atomic lock operation 611 such that it may not be interrupted by another process as it completes the designated operation. The atomic nature of the operation is useful in a multi-process system where each process is independent from the other. For example, it avoids the potential situation where two processes would verify the lock indicator and find the pointers before either process changes its value and therefore both assign the lock indicator a "locked" value believing that they have reserved the pointer.

If the lock indicator indicates that the read pointer 402 is currently reserved, then the reader process 304 performs lock contention handling 610. In this example, the lock contention handling 610 comprises a procedural spin performed, attempting at each spin to perform the atomic lock operation 611. In this example, the spin is performed a threshold number of times before sleeping the reader process 304, to be woken up by an OS event. At step 610a, the process verifies an internal spin value to determine whether the threshold spin value has been exceeded. Find it not exceeded, the process performs the spin 610b, which is a repeating procedure wherein it increments the internal spin count and attempts to perform the atomic lock operation 611 again. If at step 610a, the reader process 304 determines that the spin count exceeds the threshold (in this example a fixed value of 4000), the process increments the lock count atomically then goes to sleep to be woken up by an OS event triggered upon de-reservation of the pointers.

Once the read pointer 402 is reserved by the reader process 304, the reader process 304 sets the process owner value to its process ID and the thread owner value to the current thread ID. This may be done while the write pointer is reserved.

Having reserved the read pointer 402, in this example the reader process 304 verifies at step 604 whether the queue 400 is empty. In this example this is done by reading the msg count and comparing its value with zero, although in other embodiments this may be done on the basis of the locations of the read pointer 402 and write pointer 401. If the queue 400 is empty, the reader process releases the read pointer 402 (and therefore the write pointer 401) at step 604a and goes to sleep to be woken up by triggering the semaphore. To this end it may sleep on the semaphore that is identified in the queue metadata 403 indicative that the reader is to be woken up when an input process 301 writes into the queue 400. An input process 301, upon attempting to write into the queue 400 (e.g. upon successfully reserving the pointers) and finding the status indicating that the reader process 304 is sleeping may request the operating system trigger the semaphore identified in the queue metadata 403 to wake up the reader process 304.

Note that a queue status indicator may be defined as follows:

Status/MessageStart: int 32 bits, layout is:

| WriteInProgressBitFlag | ReaderIsSleepingBigFlag | NotUsed | NotUsed | M | A | G | I | C | W | O | R | D | ... |
|---|---|---|---|---|---|---|---|---|---|---|---|---|---|

And the reader process 304 may set the status according to the following pseudo-operation in order to indicate to a reader that it is sleeping/awaiting to read a busy slot:

```
{ //atomic operation
    If (MessageStatus & WriteInProgressBitFlag)
    {
        MessageStatus |= ReaderIsSleepingBigFlag
        return GoToSleep
    }
}
```

In this embodiment, reserving the pointers in the present example reserves not just the write pointer 401 and the read pointer 402 but an entire reservable portion of the queue metadata 403 comprising the write pointer 401, the read pointer 402, the process owner variable, the and thread owner variable. In this example, the reservable portion of the queue metadata is protected by the mechanism described herein with respect to reserving the pointers in that the input processes 301 and the reader process 304 are programmed to ascertain that the pointers (reservable portion) are not reserved and to reserve them before modifying the value of any content of the reservable portion. Thus as described herein, the process owner, and thread owner, are modified by a process while it has reserved the pointers and not when it has not, and reserving the pointers in this example is also reserving the reservable portion of the queue metadata 403.

If the queue is not empty, at 605 the reader process 304 reads the read pointer 402 to identify a location of a slot 404 to be read. In this example where the queue 400 is FIFO, the slot 404 to be read is the oldest queued slot. The reader process 304 identifies the location of at least a portion of the slot 404 to be read on the basis of the read pointer 402. In this example, the read pointer points to the start of the slot 404 to be read, and the slots 404 in the queue 400 begin with the first portion 405 containing slot metadata.

Then, the reader process 304 assesses if the designated slot is currently being written into at step 606. This may be done by, for instance, by reading the status indicator provided in the metadata of the first portion 405 of the slot 404 to be read. If the status indicates that the slot 404 to be read is "ready for reading", then the reader process 304 goes on to step 607. If, on the other hand, the status indicator indicates that an input process 301 has begun inputting data but has not completed, for instance, where the status indicator reads "started but not completed", then the reader process determines that the slot data is not yet ready to be read. In such a case, the reader process 304 changes the status of the status indicator to "reader thread waiting for message completion". Preferably, this is done by an atomic check-and-set operation, as described above.

If at step 606 the status indicates that the slot is not ready, the reader process 304 may then go to sleep on a semaphore.

Since the status has been changed (atomically while reading) to indicate that the reader process 304 is waiting to read the slot, upon completion of writing into the slot when the respective writer process changes the slot status to completed, it may (e.g. atomically with the change of status) also read the status and if it finds that the reader process 304 is waiting, it may trigger the semaphore to wake up the reader process.

Alternatively, in response, to finding the slot unready, the reader process 304 may perform status contention handling at step 612. In this example, the status contention handling is similar to lock contention handling 610 and comprises a procedural spin performed, attempting at each spin to perform the atomic status (check-and-set) operation 606. In this example, the spin is performed a threshold number of times before sleeping the reader process 304, to be woken up by an OS event. At step 612a, the process verifies an internal spin value to determine whether the threshold spin value has been exceeded. Find it not exceeded, the process performs the spin 612b, which is a repeating procedure wherein it increments the internal spin count and attempts to perform the atomic status operation 606 again. If at step 612a, the reader process 304 determines that the spin count exceeds the threshold (in this example a fixed value of 4000), the process increments the lock count atomically then goes to sleep to be woken up by an OS event triggered upon de-reservation of the pointers. Prior to going to sleep the reader process releases the read pointer 402 (in this case both pointers). Alternatively still, instead of sleeping, the reader process 304 at step 612c could interrupt or crash the input process writing into the slot 404 to be read.

At step 607, the reader process 304 releases the read pointer 402 (in fact, both pointers and the entire reservable portion of the queue metadata). This allows other processes, e.g. the input processes 301 to write into the queue 400, which requires moving the write pointer 401. Note that since the reader process 304 has not yet moved the read pointer 402 and decremented the message count, the input processes 301 do not see the slot 404 to be read as being empty and cannot write into it.

Next the reader process 304 begins to read the data from the slot 404 to be read. Note that this may be done concurrently with input processes 301 writing into the queue 400. In this example, the reader process 304 reads a slot size variable stored in the slot metadata in the first portion 405 of the slot 404 to be read and determines based thereon the location of the slot data in the slot 404 to be read. Specifically here, the first portion 405 is of a fixed size at the beginning of the slot; the reader process 304 computes the starting location of the reading based on the read pointer 402 location incremented by the first portion 405 size, and the end location based on the read pointer 402 location incremented by the slot size. In this particular example, the queue 400 circularity is implemented such that slots never straddle the end and start of the overall queue, it is not necessary to account for the end location being past the end of the queue, however in other embodiments, this may be accounted for.

Upon completion of the reading, the reader process attempts to lock the read pointer 402 again at step 611'. In this example this is done in the same manner as described in respect to step 611. Lock contention handling 610' is also resorted to in the same manner as lock contention handling 610.

Upon successful locking of the read pointer 402 (and, in this example, simultaneously the read pointer 401 and the entire reservable portion) the reader process 304 then computes a new pointer location for the read pointer 402 and assigns it to the read pointer 402. In this example the new read pointer location is the address following the end of the slot 404 which was just read, which end was previously calculated to determine how much data to read, as described herein. The reader process 304 in this example also decrements the message count (also in the reservable portion) indicate that the queue 400 now contains one fewer message. The slot that was just read has now been dequeued from the queue 400.

Next at step 613, the reader process 304 releases the read pointer 402 (and the rest of the reservable portion).

In the present embodiment computer readable instructions for instructing the processing device 203 to implement the input processes 301 and the reader process 304 are stored in memory 204 and read and executed by the processing device 203. For illustration purposes, the following pseudocode is an example of some of the sequence of instructions for inputting data into a queue:

```
TDsError TDataSinkMsgQueue::PushMsg(const IPlainMsgDataCopy &rMsg,
eImportance eTheImp)
{
    Declare variable MustSignalSemaphore and assign it to false
    Try to lock the buffer
    If (locking is successful)
    {
        Read the shared buffer information //read critical section: head (write) and tail
(read) pointers, message count, buffer size
        Calculate the quantity of data already being stored in the buffer
        Calculate the space required for the new message (including the wasted space
if a rollover is needed)
        Calculate the space remaining in the buffer for the required message priority
        If (there is space available)
        {
            //Calculate the writing location of the new message (according to
current head pointer)
            If (the buffer is empty)
            {
                Set the writing location at the beginning of the buffer
                Reset the tail and head pointers to the beginning of the buffer
            }
            Else If (the tail pointer is behind the head pointer and there is space
remaining in the buffer before rollover)
            {
                Set the writing location at the current head pointer location //i.e.
add the message after the current one
```

-continued

```
                }
                Else If (there is no more space at the end of the buffer but there is free
space at the front)
                {
                        Set the "rollover" status in the slot information header
                        Set the writing location at the beginning of the buffer
                }
                Else If (the head point is behind the tail pointer and there is place to
add the message)
                {
                        Set the writing location at the current head pointer location //i.e.
add the message after the current one before the tail pointer
                }
                If (there is a valid writing location)
                {
                        Write the message size in the slot information header
            Atomically
                        {
                                Set the "started but not completed" status in the slot
information header
                        }
                        Update the head pointer for the next message //writing location
is the local copy of the head pointer
                        Increment the message count
                        If (sole message in the queue)
                        assign true to MustSignalSemaphore
                }
            }
            UNLOCK
            //Next operations are outside the lock to speed up access to the buffer for other
processes
            Release the lock
            If (there is a valid writing location)
            {
                    Write the message at the writing location //not the head pointer which
already points to the location for the next message
                    Atomically
                    {
                        Get the status in the slot information header
                        Set the status to "ready for reading" in the slot information header
                    }
                    If (status value obtained from the last atomic operation above above was 'reader
thread waiting for message completion')
                            Assign true to MustSignalSemaphore
                                    If (MustSignalSemaphore is true)
                                            Signal the reader with the semaphore
                    Return success;
            }
        }
        Return error;
}
```

For illustration purposes, the following pseudocode is an example of some of the sequence of instructions for reading a slot of data from a queue:

```
TDataSinkMsgQueue::eProcessMsgReturns TDataSinkMsgQueue::ProcessMsg(BYTE
*pDataPtr, const LONG nKey)
{
    Try to lock the buffer
    If (locking is successful)
    {
        If (the buffer is empty)
        {
            Release the lock
            Return "go to sleep"
        }
        Get the tail pointer of the buffer //where the read is to be made
        Atomically
    {
        Get the status from the slot information header
        If (status is 'started but not completed')
        {
            Set slot information header status to 'reader thread waiting for message
completion'
        }
```

```
        }
                If (the status is 'reader thread waiting for message completion')
                {
                    Release the lock
                    Return "go to sleep not completed"
                }
                If (the status is "rollover")
                {
                    Set the tail pointer to the beginning of the buffer
                    Release the lock
                    Recursively call ProcessMsg and return its output
                }
                Else If (the status is "ready for reading")
                {
            Get the message size
                    Release the lock
                    Read the message from the buffer and propagate it //read operation is
outside the lock to allow input processes to write while the queue is being read
                    Try to lock the buffer again
                    If (locking is successful)
                    {
                        Update the tail pointer for the next read
                        Decrement the message count in the buffer
                        Release the lock
                    Return success //keep going
                    }
                    Else
                    {
                        //even if lock failed, put in a somehow valid state
                        Update the tail pointer for the next read
                        Decrement the message count in the buffer
                            Return error
                    }
                }
                Else
        {
                    Return an error
            }
        }
    Else
    {
            Return an error
    }
}
```

For illustration purposes, the following pseudocode is an example of some of the sequence of instructions for running a reader process:

```
void TDataSinkMsgQueue::RunIt( )
{
        Get the buffer data pointer //(i.e. the first message slot just after the shared buffer
information)
        Get the current thread ID
        Get the shared buffer information //(i.e. critical section: head (write) and tail (read)
pointers, message count, buffer size)
    Declare variable MsgNotCompletedCount, assign 0 to it
    While (runningFlag is TRUE) //intial value of the flag is TRUE
    {
            Wait on the semaphore, but only until a maximum delay
            While (runningFlag is TRUE)
            {
                    Process a message from the buffer //method: ProcessMsg( )
                    If (read is successful)
            {
                Assign 0 to MsgNotCompletedCount
                        Continue in this loop
        }
                    Else If (must go to sleep) //i.e. no message at all in the queue
            {
                Assign 0 to MsgNotCompletedCount
                        Break the loop and go wait on the semaphore
        }
                    Else If (must go to sleep because the message is not completed)
                    {
                            Increment MsgNotCompletedCount by 1
```

```
            If (MsgNotCompletedCount is bigger than 2)
            {
                //The queue is blocked on an incomplete message
                Stop the queue
                Set the runningFlag to FALSE
                Return an error
            }
            Break the loop and go wait on the semaphore
        }
        Else
        {
            //There was an error when processing the message
            Stop the queue
            Set the runningFlag to FALSE
        Return and error
        }
      }
    }
}
```

The above pseudocode also illustrates a rollover procedure for dealing with inputting and reading data when the pointers reach the end of a queue, and must return to the beginning.

Returning to FIG. 6 and FIG. 8, in certain implementations, reading efficiency can be increased by allowing the reader process to address several readable slots at a time. As shown, the reader process 304 enters locked operation in order to identify the next slot to read. In certain embodiments, the number of times that the reader process 304 enters locked operation may be reduced by identifying multiple slots that are ready to read within a same locked operation. Thus after verifying that the queue is empty (604, 815), the reader process 304 may note not just the next slot ready to read, but also others, and verify their statuses. To this end, steps 605 and 606 may proceed as described, however they may be expanded by additional step to add more slots to be read. In one such embodiment, the reader process may do this sequentially, by following up steps 605 and 606 with steps to identify the next readable slot and to verify its status.

To this end, the reader process 304 may first determine whether there is a next slot to be read. In one example where the msg count variable stores the number of available slots, this may involved verifying at step 604 not only whether the queue 400 is empty but also noting how many slots there are to read. This number may be stored by the reader process in a variable as cache for quick access. Following verification of the first slot status, the next slot status may be verified, after finding the location of the next slot. If the queue 400 has fixed slot lengths, finding the next slot may simply involve adding the slot length to the read pointer value. In other embodiments, however, where the slot length is variable, finding the next slot may be done by reading the size indicator in the metadata in the first portion 405 of the first available slot at the read pointer, and adding this value to the value of the read pointer to find the start of the next slot. This may be done after verifying the slot status if it is desired to read the next slot only if the present one is ready and may be done conditionally if the present slot is ready. If an embodiment comprises no metadata indicating the number of slots occupied in the queue, after finding the location of the start of the next slot, this location may be compared to the write pointer so as to ascertain whether it is logically at or after the write pointer and if so determine that there is no next slot to read.

It will be appreciated that the identifying of a next slot can take place a number of times, if the number of used slots is known, e.g. if there is a msg count variable indicating it, it may be done, e.g., for every slot present. Identifying readable/ready slots may also be done up until the first slot that is not ready to be read, by readying the slot status as described and stopping the finding of new slots once a slot is found that does not have a ready status. A maximum preset number of slots may also be defined such that the reader process will identify a number of available slots to read up to that preset maximum such (for example if we want the reader process 304 to process, e.g., up to 10 slots at a time). This constraint may be a way of enforcing the freeing up of read slots before reading for too long. In order to be able to process these slots after having released the pointers, the reader process 304 may store the starting locations of each available slots, e.g. along with an indicator of the number of slots to be read, in its own memory. A FIFO stack-like arrangement may be used to store available slot locations (e.g. with a stack size variable).

It will be noted that in the interest of keeping the reading sequential, it may be preferable for the reader process 304 to identify slots that are available for reading up to the first unready slot, rather than, for example, identifying slots that have been assigned and processing the ones that are available. However, in certain embodiments, it may be possible to identify a number of slots (e.g. all) slots that have been assigned, including if necessary reading their status to identify the next slot, and note every slot regardless of their readiness status. In such a case, the slots may be read in sequence with readiness being ascertained (e.g. atomically as described above) before reading each slot. When an unready slot is encountered, the reader process 304 could conceivably skip it to return to it, but in order to enforce a FIFO order of reading, the reader process 304 may then stop reading (preferably having atomically set the unready slot's status to an indicator that the reader process 304 is waiting) and clear its memory/cache of other unread slots and proceed to the locked operation to update the pointers to free up the read slot. Upon returning to reading, the reader process 304 will restart from the previously-unready slot.

Having identified multiple slots to read, the reader process 304 may then exit locked operation by releasing the pointers and may then undertake to read the data from the identified slots. As mentioned, in order to maintain FIFO operation in the queue 400, if desired, the reader process 304 may read the available slots in order. Now after having read each slot, the reader process may proceed as described already to enter locked operation and free up the slot to be written in by moving the pointers (see 611'-613; 845-855). However, slots may also be freed multiple at a time in order to decrease the number of locked operations performed by the reader process 304. (Note that identifying multiple slots at a time may also decrease the number of locked operation by the reader process 304.) In one example, the reader process 304 may wait until the total number of slots found available to be read may have been read before entering locked operation and freeing them up. However, as mentioned, the reader process 304 may be configured to store identifications of the slots that have been read (e.g. as a separate entity, e.g. a stack-like arrangement, or with a flag in the storage of available slots) and to free up the read slots as soon as an unready slot is encountered. This way, the queue is not burdened with read slots while the reader process 304 awaits on a slot. Moreover, additional or alternate constraints may be imposed. For example, the reader process 304 may be configured to count read slots up to a maximum threshold and to free up read slots when the maximum is reached. In one example, the reader process 304 may free up read slots when the first of a maximum threshold is achieved, all identified ready slots have been read, or a first unready slot has been reached.

By setting a threshold at which to free the slots other than the complete set of identified available slots, be it one slot (as described earlier) or a higher number (e.g. 10), the reader process 304 ensures that read queue is not kept for too long if it has identified a large number of available slots to read. As already mentioned another way of ensuring this is to impose a maximum number of slots that can be identified in the first place (this may also be done to limit time spent in the first locked operation). In order to free up slots, a similar operation takes place as has been already described for a single slot, but as applied to multiple slots. In particular, the reader process 304 computes the total displacement of the pointers based on a computation of the total size of the queue taken up by the sum of all the read slots (e.g. sum of their size) and moves the pointer accordingly. If more slots remain to be read (e.g. if the freeing up was triggered by the reaching of a maximum threshold, e.g. 10), then the reader process 304 may loop back to the reading portion of the process after unlocking the pointers. Alternatively (e.g. if the freeing up was caused by an unready slot) the reader process 304 may clear the remainder of available slots from its memory and return to the initial ready-to-read portion of the process. Alternatively, if the reader process still had slots that were identified as available when it hit an unready slot it could conceivably return to the reading portion of the process, preceding each reading by a verification of the slot status, however in the present implementation an unready slot typically indicates that the reader is at or near the front (writing edge) of the queue 400, it is considered appropriate to return to step 805.

It should be noted that if in an embodiment writer processes are expected to have multiple different slots of data to write to the queue, a similar mechanism can be used by the writer process to reserve multiple slots at a time while in locked operation. However in the present example, this is not the case.

Identifying the next readable slot may involve both determining whether there is a next slot to read and the starting location of the next slot. Determining whether there is a next slot to be read may invol If the queue 400 has fixed size slot, identifying If not msg count, find next slot based on slot status (length) and augment size to pointer, as done in 609

Although in the above example certain queue parameters (such as size, etc. . . . ) were fixed, in some embodiments, a queue altering mechanism may be implemented, for example to grow the queue if necessary. To this end, the master process (e.g. reader process) to alter the queue (e.g. to grow the size of the data portion of the queue) and update the metadata accordingly. This may include using other types of inter-process communications to cause all other processes communicating with the queue to stop accessing the queue and transmitting new queue parameters.

Although the present technology was described with respect to data streams, it should be understood that the foregoing can be applied and/or adapted to instances where multiple input processes are communicating with a reader process, whether or not these communications involve the transfer of stream data. For example, input multiple processes may be providing pulled data to a reader process. In one example, multiple input processes are providing individual images transmitted, e.g., on an ad-hoc basis. In such examples, the input process may communicate with the reader process in a manner described herein.

The present description has been provided for purposes of illustration but is not intended to be exhaustive or limited to the disclosed embodiments. Many modifications and variations will be apparent to those of ordinary skill in the art.

The invention claimed is:

1. A method for transferring an arbitrary sized quantity of data by a particular input process to a reader process for processing by the reader process wherein a plurality of other input processes are in communication with the reader process to transfer thereto other data, the method comprising:
    accessing in a shared memory a data queue that is concurrently accessible by the plurality of other input processes, the data queue having a write pointer indicative of the start of available writing space in the data queue, and the data queue being readable by the reader process for processing the data therein;
    verifying that the write pointer is not currently reserved and on determining that the write pointer is not reserved, reserving the write pointer to prevent the other input processes from modifying it;
    computing a new pointer location to accommodate the arbitrary sized quantity of data in a logically contiguous slot of the data queue and assigning the new pointer location to the write pointer while it is reserved;
    after having assigned the new pointer location to the write pointer, releasing the write pointer from reservation then inputting the arbitrary sized quantity of data into the logically contiguous slot of the data queue, such that another input process from among the plurality of other input processes may concurrently input data into the data queue.

2. The method of claim 1, wherein the data queue further has a read pointer indicative of the start of readable slots in the data queue and wherein reserving the write pointer also reserves the read pointer, and releasing the write pointer also releases the read pointer.

3. The method of claim 2, wherein the data queue comprises a lock indicator accessible by the particular input process and plurality of other input processes which is indicative of whether the write pointer is reserved, wherein verifying that the write pointer is not currently reserved comprises reading the lock indicator and assessing its value, wherein reserving the write pointer comprises assigning the lock indicator a value indicating that the write pointer is reserved; and wherein releasing the write pointer comprises assigning the lock indicator a value indicating that the write pointer is no longer reserved.

4. The method of claim 3, wherein the lock indicator is also indicative of whether the read pointer is reserved such that reserving and releasing the write pointer also reserves and releases the read pointer.

5. The method of claim 1, wherein inputting the arbitrary sized quantity of data into the logically contiguous slot of the data queue comprises locking the logically contiguous slot against reading prior to writing into it and unlocking the logically contiguous slot for reading upon completion of writing into it.

6. The method of claim 5, wherein the logically contiguous slot comprises a section of metadata comprising a status indicator, locking the logically contiguous slot comprises assigning the status indicator a value indicative that the logically contiguous slot is being written into before inputting the arbitrary sized quantity of data into the logically contiguous slot.

7. The method of claim 6, wherein inputting the arbitrary sized quantity of data into the logically contiguous slot further comprises after inputting the arbitrary sized quantity of data into the logically contiguous slot, atomically reading the status indicator and assigning the status indicator a value indicative that the logically contiguous slot is ready to be read.

8. The method of claim 7, further comprising, if the status indicator as read after inputting the arbitrary sized quantity of data into the logically contiguous slot indicates that the reader is waiting to read the data in the logically contiguous slot, triggering an interprocess communication to alert the reader process that the logically contiguous slot is available for reading.

9. A system for transferring surveillance data from multiple input processes concurrently providing respective surveillance data streams to a reader process for processing the surveillance data, the system comprising:
   a. a data queue provided on a shared memory concurrently accessible by the multiple input processes for enqueuing surveillance data to be processed by the reader process and accessible by the reader process for dequeuing the surveillance data to be processed by the reader process, the data queue having:
      i. a write pointer indicative of the start of available writing space in the data queue;
      ii. a lock indicator indicative of whether a process has reserved the write pointer;
   b. a non-transitory computer-readable storage medium comprising computer-readable instructions executable by a general-purpose processing device to implement a particular input process from among the multiple input processes, the computer-readable instructions instructing general-purpose processing device to:
      read the lock indicator to determine whether another process has reserved the write pointer, and on determining that no other process has reserved the pointer, reserve the write pointer by assigning the lock indicator a value indicating that the write pointer has been reserved;
      upon reserving the write pointer, compute a new pointer location to accommodate an arbitrary sized portion surveillance data in a logically contiguous slot of the data queue and assign the new pointer location to the write pointer while it is reserved;
      upon assigning the new pointer location, releasing the write pointer by assigning the lock indicator a value indicating that the write pointer is no longer reserved then inputting the arbitrary sized portion of the data stream into the logically contiguous slot of the data queue, while the write pointer is released, such that another input process from among the plurality of other input processes may concurrently input data into the data queue.

10. The system of claim 9, wherein the data queue further has a read pointer indicative of the start of readable slots in the data queue and wherein the lock indicator is also indicative of whether the read pointer is reserved such that reserving and releasing the write pointer also reserves and releases the read pointer.

11. The system of claim 9, wherein the logically contiguous slot comprises a section of metadata comprising a status indicator, and wherein the computer-readable instructions include instructions for when inputting the arbitrary sized portion of the data stream into the logically contiguous slot of the data queue, locking the logically contiguous slot against reading and assigning the status indicator a value indicative that the logically contiguous slot is being written into prior to inputting the arbitrary sized portion of the data stream into the logically contiguous slot.

12. The system of claim 11, wherein the computer-readable instructions include instructions for unlocking the logically contiguous slot for reading by atomically reading the status indicator and assigning the status indicator a value indicative that the logically contiguous slot is ready to be read after inputting the arbitrary sized portion of the data stream into the logically contiguous slot.

13. The system of claim 12, wherein the computer-readable instructions include instructions for if the status indicator as read after inputting the arbitrary sized portion of data stream into the logically contiguous slot indicates that the reader is waiting to read the data in the logically contiguous slot, triggering an interprocess communication to alert the reader that the logically contiguous slot is available for reading.

14. The system of claim 13, wherein triggering an interprocess communication comprises signaling the reader process using a semaphore.

15. A method for transferring stream data from a plurality of input processes providing stream data onto a data queue in shared memory that is concurrently accessible by the plurality of input processes and comprises one or more arbitrary sized data slots containing stream data each having been enqueued by one of the plurality of processes, and the data queue having a read pointer indicative of the start of readable slots in the data queue, to a reader process processing by the reader process, the method comprising:
   accessing in the shared memory the data queue;
   verifying that the read pointer is not currently reserved and on determining that the read pointer is not reserved, reserving the read pointer to prevent the input processes from modifying it;
   atomically assessing whether a first slot is currently being written into;
   upon the assessing that the first slot is not currently being written into, releasing the read pointer then reading the data contained in the first slot identified by the read pointer for processing, wherein if the assessing determines that the first slot is currently being written into, the data contained in the first slot is not read;
   verifying that the read pointer is not currently reserved and on determining that the read pointer is not reserved, reserving the read pointer to prevent the input processes from modifying it and computing a new pointer location corresponding to a subsequent slot in the data queue and assigning the new pointer location to the read pointer.

16. The method of claim 15, wherein atomically assessing whether the first slot is currently being written into comprises identifying a status indicator in a section of metadata within the first slot and reading the status indicator to determine whether it is indicative of the first slot being written into.

17. The method of claim 16, further comprising if the assessing determines that the first slot is currently being written into, assigning the status indicator a value indicative that the reader process is awaiting completion of the writing.

18. The method of claim 17, further comprising after assigning the status indicator a value indicative that the reader process is awaiting completion of the writing, performing a wait procedure until a rousing event establishes that the first slot is ready to be read.

19. The method of claim 18, further comprising, by an input process currently writing into the first data slot: completing the writing into the first data slot and triggering an interprocess communication to alert the reader process that the logically contiguous slot is available for reading.

20. The method of claim 18, wherein the wait procedure is a cycle that comprises a periodic assessment whether the first slot is currently being written by reading the status indicator and wherein the rousing event assessing, during a periodic assessment, that the first slot is not currently being written into.

21. The method of claim 15, wherein computing a new pointer location comprises
verifying that the read pointer is not currently reserved and on confirming that the read pointer is not reserved, reserving the read pointer to prevent the input processes from modifying it,
upon reserving the read pointer, assigning the new pointer location to the read pointer then releasing the read pointer.

22. The method of claim 15, wherein the data queue comprises a lock indicator accessible by the reader process and plurality of input processes which is indicative of whether the read pointer is reserved, wherein verifying that the read pointer is not currently reserved comprises reading the lock indicator and assessing its value, wherein reserving the read pointer comprises assigning the lock indicator a value indicating that the read pointer is reserved; and wherein releasing the read pointer comprises assigning the lock indicator a value indicating that the read pointer is no longer reserved.

23. The method of claim 22, wherein the data queue further has a write pointer indicative of the start of available writing space in the data queue and wherein reserving the read pointer also reserves the write pointer, and releasing the read pointer also releases the write pointer.

24. A system for transferring surveillance data from multiple input processes concurrently providing respective surveillance data streams to a reader process for processing the surveillance data, the system comprising:
a. a data queue provided on a shared memory concurrently accessible by the multiple input processes for enqueuing surveillance data to be processed by the reader process and accessible by the reader process for dequeuing the surveillance data to be processed by the reader process, the data queue having:
 i. a read pointer indicative of the start of readable slots in the data queue;
 ii. a lock indicator indicative of whether a process has reserved the read pointer;
b. a non-transitory computer-readable storage medium comprising computer-readable instructions executable by a general-purpose processing device to implement a reader process, the computer-readable instructions instructing general-purpose processing device to:
access in the shared memory the data queue;
verify that the read pointer is not currently reserved and on determining that the read pointer is not reserved, reserve the read pointer to prevent the input processes from modifying it;
atomically assess whether a first slot is currently being written into by identifying a status indicator in a section of metadata within the first slot and reading the status indicator to determine whether it is indicative of the first slot being written into;
upon the assessment that the first slot is not currently being written into, releasing the read pointer then read the data contained in the first slot identified by the read pointer for processing, wherein if the assessment determined that the first slot is currently being written into, the data contained in the first slot is not read;
verify that the read pointer is not currently reserved and on determining that the read pointer is not reserved, reserving the read pointer to prevent the input processes from modifying it and compute a new pointer location corresponding to a next slot in the data queue and assigning the new pointer location to the read pointer.

25. The system of claim 24, wherein the data queue further has a write pointer indicative of the start of available writing space in the data queue readable slots in the data queue and wherein the lock indicator is also indicative of whether the write pointer is reserved such that reserving and releasing the read pointer also reserves and releases the write pointer.

26. The system of claim 25, wherein the computer-readable instructions include instructions for if the assessing determines that the first slot is currently being written into, assigning the status indicator a value indicative that the reader process is awaiting completion of the writing.

27. The system of claim 26, wherein the computer-readable instructions include instructions for after assigning the status indicator a value indicative that the reader process is awaiting completion of the writing, performing a wait procedure until a rousing event establishes that the first slot is ready to be read.

28. The system of claim 27, wherein the computer-readable instructions include input process instructions for implementing one the plurality of input processes, the input process instructions instructing general-purpose processing device to input data into the first data slot;
upon completion of inputting data into the first data slot, assess whether the reader process is awaiting completion of the writing by identifying the status indicator in the section of metadata within the first slot and reading the status indicator to determine whether it is indicative of the reader process awaiting completion of the writing;
upon an assessment that the reader process is awaiting completion of the writing, triggering an interprocess communication to alert the reader process that the logically contiguous slot is available for reading.

29. The system of claim 26, wherein the wait procedure is a cycle that comprises a periodic assessment whether the first slot is currently being written by reading the status indicator and wherein the rousing event assessing, during a periodic assessment, that the first slot is not currently being written into.

30. The system of claim 24, wherein the computer-readable instructions include instructions for computing a new pointer location by:
- verifying that the read pointer is not currently reserved and on confirming that the read pointer is not reserved, reserving the read pointer to prevent the input processes from modifying it,
- upon reserving the read pointer, assigning the new pointer location to the read pointer then releasing the read pointer.

* * * * *